(12) United States Patent
Andersen et al.

(10) Patent No.: US 10,379,705 B2
(45) Date of Patent: Aug. 13, 2019

(54) TUNING EDUCATIONAL SYSTEM DATA STRUCTURES IN AN INTERACTIVE ENVIRONMENT

(71) Applicants: Maria Haverhals Andersen, Sandy, UT (US); Diane Weaver, Salt Lake City, UT (US); Karsten Hvidberg, Hellerup (DK)

(72) Inventors: Maria Haverhals Andersen, Sandy, UT (US); Diane Weaver, Salt Lake City, UT (US); Karsten Hvidberg, Hellerup (DK)

( * ) Notice: Subject to any disclaimer, the term of this patent is extended or adjusted under 35 U.S.C. 154(b) by 0 days.

(21) Appl. No.: 15/953,158

(22) Filed: Apr. 13, 2018

(65) Prior Publication Data

US 2018/0300024 A1 Oct. 18, 2018

Related U.S. Application Data

(60) Provisional application No. 62/485,074, filed on Apr. 13, 2017.

(51) Int. Cl.

| G06F 3/0482 | (2013.01) |
|---|---|
| G09B 5/08 | (2006.01) |
| G06F 16/26 | (2019.01) |
| G06F 16/22 | (2019.01) |
| G09B 7/00 | (2006.01) |
| G09B 19/00 | (2006.01) |
| G06F 3/0481 | (2013.01) |

(52) U.S. Cl.
CPC ........ *G06F 3/0482* (2013.01); *G06F 16/2228* (2019.01); *G06F 16/26* (2019.01); *G09B 5/08* (2013.01); *G09B 7/00* (2013.01); *G09B 19/00* (2013.01); *G06F 3/04815* (2013.01)

(58) Field of Classification Search
CPC .................................................... G06F 3/0482
USPC .......................................................... 715/708
See application file for complete search history.

(56) References Cited

U.S. PATENT DOCUMENTS

| 8,028,250 | B2 * | 9/2011 | Vronay | G06F 3/0482 |
| | | | | 715/853 |
| 9,529,892 | B2 * | 12/2016 | Tibrewal | G06F 16/285 |
| 2003/0004961 | A1 * | 1/2003 | Slothouber | G06F 9/445 |
| 2004/0128699 | A1 * | 7/2004 | Delpuch | H04N 7/165 |
| | | | | 725/120 |
| 2010/0058248 | A1 * | 3/2010 | Park | G06F 3/0481 |
| | | | | 715/851 |
| 2010/0226366 | A1 * | 9/2010 | Lee | H04L 65/607 |
| | | | | 370/389 |
| 2011/0212717 | A1 * | 9/2011 | Rhoads | G06K 9/00664 |
| | | | | 455/420 |
| 2014/0028710 | A1 * | 1/2014 | Baker | G06F 3/04886 |
| | | | | 345/629 |

(Continued)

*Primary Examiner* — William D Titcomb
(74) *Attorney, Agent, or Firm* — Workman Nydegger

(57) ABSTRACT

Systems and methods for presenting visual representations of educational system components at various levels of relational depth depending on the location within the data structure the desired data is located. The user interface also includes one or more visualizations for data-structure exploration to allow a user to move between data set layers, view and/or edit detail about particular data within a data set layer, and to create or view 2D and simulated 3D visual representations of relationships between data within a particular layer and between data of differing layers.

20 Claims, 15 Drawing Sheets

(56) References Cited

U.S. PATENT DOCUMENTS

2014/0059497 A1\* 2/2014 Burckart ............... G06F 3/0482
715/854
2014/0337321 A1\* 11/2014 Coyote ................ G06F 3/0482
707/722

\* cited by examiner

TUNING EDUCATIONAL SYSTEM DATA STRUCTURES IN AN INTERACTIVE ENVIRONMENT

CROSS-REFERENCE TO RELATED APPLICATIONS

This application claims the benefit of U.S. Provisional Patent Application No. 62/485,074 filed on Apr. 13, 2017, entitled "TUNING EDUCATIONAL SYSTEM DATA STRUCTURES IN AN INTERACTIVE ENVIRONMENT," and which application is incorporated herein by reference in its entirety.

BACKGROUND

In order to ensure desirable educational outcomes for students, a great deal of thought and planning must occur with regard to how coursework is designed and executed. While students themselves may only think in terms of passing their current course, educational system designers, administrators, and others must also develop programs within institutions that require students to engage in learning that helps them to reach particular objectives.

Broadly, successful educational system designs tend to utilize a paradigm of starting with a broad set of institutional objectives. These broad objectives are then met by implementing programs formulated to meet those objectives. Programs, in turn, comprise discrete courses or experiences with actual content or experiences for students that build toward both programmatic and institutional level objectives.

As such, programs within an institution are often the main focus of institutional and educational planning. Successful programs are likely organized in a manner that ensures high-level institutional objectives by ensuring everything from an atomized content chapter from a text book all the way to graduation, maps from the atomic level, to course objectives and/or competencies, then to program objectives, and finally to institutional objectives. However, the interrelationships among these points are far more complex than a simple "A" leads to "B" which leads to "C" system. Rather, a particular data point often maps to points above, below, and parallel within the data structure. In other scenarios, only collections of data points at one level are capable of successfully mapping to a higher-level objective so it becomes imperative to understand all of the interrelationships in order to design a successful educational system data structure.

As such, tightly integrated educational system data structures result in extremely complex interrelationships among hundreds or even thousands of discrete learning objectives at just a program level. For large institutions like traditional universities, millions of data points must be planned, implemented, tracked, and maintained in order to ensure students obtain the requisite content and experiences in order to meet institutional objectives and success metrics.

As one hypothetical example, many large State Universities in the United States have 15-20 degree-granting colleges comprising 200, or more, different academic programs. At the University level, numerous broad goals and outcomes are likely to be identified as representing skills, behaviors, or other broad characteristics the University has deemed necessary for students to obtain by the end of a given program. Likewise, each of the 200 or so programs will have broad goals and objectives that are designed to feed into the University goals and outcomes. Next, each of those 200 or so academic programs will often comprise as many as 50 individual courses. Within each individual course, perhaps 5-10 specific course outcomes are identified. Finally, in order to achieve those 5-10 course outcomes, each specific outcome is atomized into numerous individual student activities, experiences, learning objectives, or other learning items. Thus, for an organization with a structure similar to this hypothetical State University, it is entirely conceivable that tens of millions (if not hundreds of millions) of interrelationships must be identified and their relationships tracked and validated, to ensure that students who complete programs have been exposed to the content and objectives sufficient to master learning objectives, competencies, courses, programs, degrees, and University outcomes. Additionally, as objectives change, the interrelationships must also be changed in an efficient manner.

Similar instructional design use cases also exist within the Kindergarten through $12^{th}$ grade (K-12) educational system. While the demands within an individual school may be less than a traditional University, the data interrelationships are still vastly more complex than can effectively been managed using current systems. Further, when multiple schools need to be managed at district, State, or even Federal levels, management and validation of educational systems becomes extremely complex.

Further, while traditional educational systems will be used throughout this specification as being obvious benefactors of the methods and systems described herein, it should also be recognized that there is applicability within corporate training and education environments, as well.

Regardless of the level of educational system or the type of corporate training environment that is utilizing the embodiments described herein, there is likely a need to uphold standards, accreditations, and certifications. The process for proving certification, accreditation, and standards mapping is extremely difficult and complex to provide. Businesses and institutions depend on meeting these requirements. Thus, it should be appreciated that a need exists for providing efficient methods and systems to create and maintain the vast datasets and interrelationships described above.

Current systems for managing such large datasets of relationships are cumbersome and unreliable. Commonly, due to the vast array of programs and courses within a large institution, silos develop. This often results in courseware development and revisioning occurring at a course or even learning objective level without corresponding changes being reflected to, or reflective of, higher level objectives or requirements. Similarly, it is also common for high-level institutional or programmatic objectives or requirements to change requiring some system or method for propagating, or at least validating, the presence of those changes all the way down to any particular atomized learning objective or experience.

When revisions are necessary, additional infrastructure or avenues are needed for stakeholders to discuss changes that are needed. Commonly, such information simply resides in the memories of the individual stakeholders, or perhaps within disparate data stores (e.g., email archives.) As such, is it also desirable to include within a course structure dataset a methodology of capturing institutional knowledge and dataset relational history.

Commonly, vast collections of static tracking methods are utilized in an attempt to track the necessary relationships. However, traditional modes of organization such as spreadsheets are simply inadequate to efficiently and accurately track such large numbers of relationships, and that is to say nothing about managing long-term historical information regarding information such as decisions made in prior course versions, historically different institutional directives, or due to changes in accreditation or the like. Commonly, such information is simply never formally recorded, and even where it is, there is often little to no context linking it to related dataset components in a manner that allows it to be leveraged at a later time by perhaps a different set of educational system designers or institution administrators.

Even in scenarios where such enormous data sets can be reliably tracked, the ability for educators to interact with the data in a meaningful way is difficult at best because flat file databases, tracking sheets, and other such means simply do not provide enough transparency into the data to be helpful. Additionally, the configuration, maintenance, and use of such prior art systems requires technically adept users who are also familiar with the underlying data structures. And even then, such users are unlikely to discover some types of relationships.

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

Computer systems have also enabled the educational dataset management structures that can handle the enormous datasets and interrelationships inherent in such structures, as discussed herein. Additionally, user interfaces are now capable of presenting such relationships in unified ways and in a consistent interface. Additionally, computing systems have enabled additional capabilities for managing educational planning datasets that were simply impossible prior to the existence of dedicated hardware and software systems such as those presented herein.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a method for tuning educational system data structures in an interactive environment. For example, embodiments may include a user interface that includes presenting visual representations of educational system components at various levels of depth and detail depending on the location within the data structure the desired data is located. The user interface also includes one or more toolsets for data-structure exploration to allow a user to move between data set layers, view and/or edit metadata about particular data within a data set layer, and to create or view visual representations of relationships between data within a particular layer and between data of differing layers.

In some other embodiments, a user interface is presented wherein a user can move between a generally two-dimensional representation of a current educational system structure to an interactive three-dimensional representation of the current educational system structure in order to explore historical information about the educational system. In such embodiments, the three-dimensional structure provides an interface to explore historical changes and historical data about the data structure while providing a user with a visual context that improves understanding of changes that have occurred to the dataset over time. Additional features of the interface provide visual representations of missing components, incomplete relationships, or other desirable characteristics.

In another embodiment, a user interface is provided wherein one or more users can collaboratively build an educational system dataset from scratch or from some level of imported data. In such embodiments, a user interface is leveraged to build interrelationships among items in the data set while visually validating that goal-oriented dataset items are properly mapped and related to dataset items representing actual educational system content or experiences. In this manner, such embodiments allow for a designer to created, validate, and implement an educational system data structure through a visual interface that provides both underlying data processing capabilities as well as visual context to data relationships.

Accordingly, tuning educational system structures in the various manners described through the embodiments herein is a great improvement upon traditional methods in many ways. Particularly, because a single, centralized, interface is provided to manage a complete educational system data structure, significantly fewer source documents are necessary. This not only improves user efficiency, but greatly reduces impacts on computer systems inherent in systems that require users to switch between different applications for different objectives (e.g., using a spreadsheet to keep track of course details, a separate chat application to collaborate with team members, and an email account to keep track of historical decisions.) By consolidating all of the necessary tools to manage educational system data structures in one environment, fewer resources are required.

Specific improvements over prior technical solutions in this technological field are recognized in numerous ways. Primarily, the visualizations described both in the following detailed description and associated figures, greatly reduce the complexity of prior course mapping solutions. For example, a columnar course versioning visualization will be described. In some embodiments, such a visualization replaces numerous "flat-file" tracking sheets (e.g., spreadsheets) consolidating all of the information within a single visualization. In addition to reducing the number of files (and associated storage, tracking, management, etc.), embodiments of a columnar course versioning visualization provides new, visual detail to the course mapping process. In so doing, new relationships among data can be realized, mapped, and improved.

Similarly, due to the inherent nature of graphical visualizations, relationships among data can be modeled and presented more rapidly and using fewer computing resources than is required when data is spread across multiple locations, formats, and owners. In this manner, computer systems employing the concepts described herein are capable of generating and displaying relationships among educational data structures by using visualizations that were not previously possible.

Additionally, the concepts described herein provide not only the underlying infrastructure for visually generating and maintaining an underlying data structure, but additionally provide novel graphical visualizations of that data. In so doing, a user's experience interacting with the data is improved. For example, the speed with which a user can identify a relationship between a particular learning objective within a course and other learning objectives, bundles, competencies, assessments, activities, or the like, is greatly improved over having to look such data up in one of many tables that opaquely tracks the underlying relationships for the particular learning objective. In this way, the visualizations streamline the ability for a user to discover, create, explore, and modify relationships among data sets without being required to directly modify underlying data structures. Such improvements to tuning educational data structures were previously unavailable and represent an improvement to the technical art of data visualizations, computer-aided instructional design, and computer-aided educational data structure design and validation.

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1A:
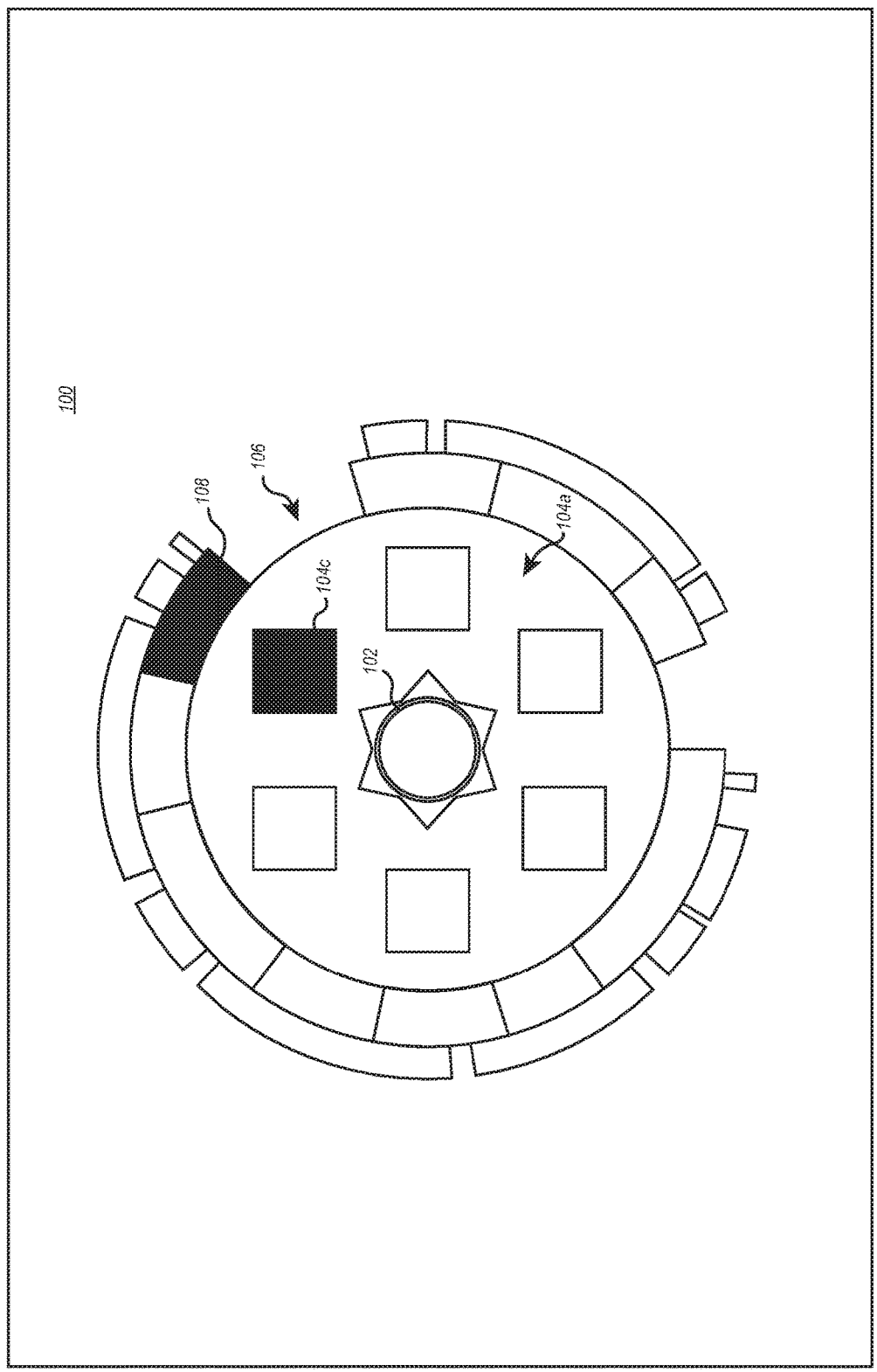
FIGS. 1A and 1B illustrate an exemplary interactive data structure tuning environment at one data level depth, including a parallel data model for simultaneously designing both course goals and learning delivery, according to an embodiment.
Figure 1B:
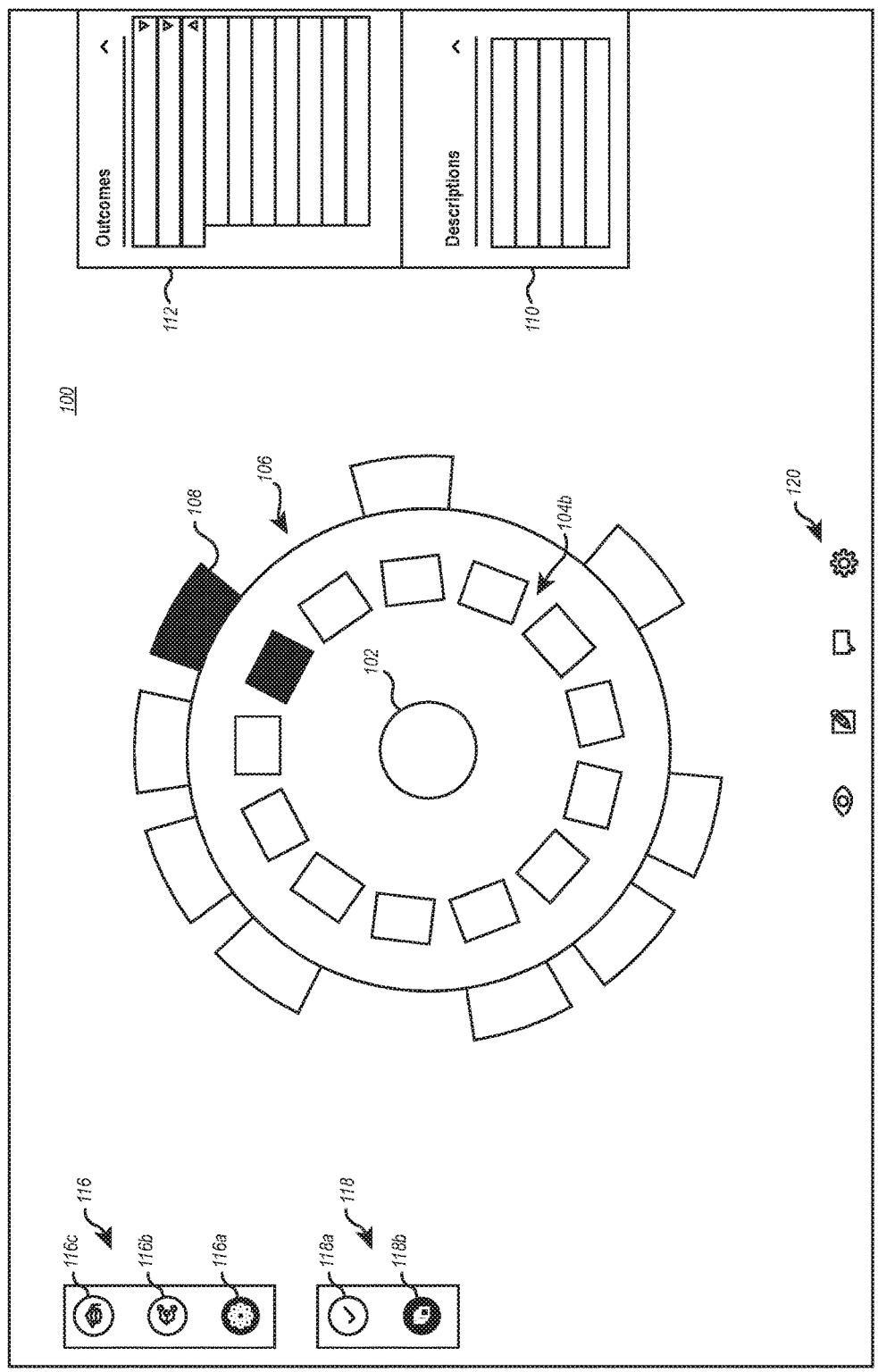

FIGS. 1A and 1B illustrate an interactive environment for tuning educational system data structures at a particular data structure depth. As used herein, "tuning" encompasses a wide variety of concepts including, but not limited to, creating data points representing portions of an educational system, defining relationships between data points, editing data points and their relationships, visualizing existing data relationships, identifying missing relationships, modifying relationships, validating and reporting on relationships. Additionally, depending on context, activities such as refining, optimizing, incorporating feedback, creating actionable data, enabling direct communication, and alerting users when they break an instructional strand or alignment to a learning outcome and other activities involving interaction with and modification of any portion of an educational system data structure may also be encompassed within the meaning of "tuning."

In FIG. 1A, a tuning interface for a data structure at a "course" depth is illustrated. FIG. 1A includes a tuning environment 100. Within the tuning environment 100, a particular course 102 is identified within a centralized position in order to aid a user in remaining visually oriented to the course-level based tuning features. Surrounding the particular course 102 is a series of "competencies" 104a that are linked to the particular course 102. As will be discussed later in conjunction with FIG. 2B, depending on the visualization options selected in conjunction with tuning environment 100, the competencies 104a may be replaced by "bundles" 104b of FIG. 2B. This is helpful in order for a user to visually identify different relationships among various subsets of organization within particular course 102. For example, a user may be interested in seeing the grouping of competencies 104a in relation to course 102, or to see the relationship of bundles 104b in relation course 102. Notably, in some embodiments, one or more data elements from either competencies 104a or bundles 104b may be present in the other data set. In some embodiments, the data sets comprising competencies 104a and bundles 104b may be wholly unique.

Further, as illustrated, competencies 104a are visually arranged around the identifier of course 102 forming at least an intermittent concentric circle. Depending on the number of competencies 104a (or alternatively bundles 104b), the graphical identifier of course 102 may include visual indications pointing to a particular competency 104a.

This organization through a series of concentric circles enables a visualization that can accommodate increasingly detailed information as it moves from a high-level data element (e.g., the identity of course 102), to lower level data elements such as competencies 104a or bundles 104b, and then, in some embodiments, to a lower level data element such as learning objectives.

This concept is then extended to an additional concentric circle surrounding competencies 104a that includes a plurality of "learning objectives" 106. Notably, every learning objective 106 surrounding competencies 104a are linked to a particular competency 104a and is visually grouped within the area surrounding the competencies 104a according to that grouping. Thus, one learning objective group 108 is linked to the competency 104c, which is then linked to the course 102. It should be appreciated that other groupings of learning objectives are also linked to a corresponding competency 104a according to a visual grouping. Notably, perfect linking of all learning objective groups to a particular competency 104a only occurs once tuning activities have been completed for a particular course, such as course 102. Thus, while FIG. 1A illustrates course 102 as having completing mapping of each learning objective group to a competency, in some embodiments one or more learning objective group, or even a particular learning objective within the group, may not be mapped to any competency 104a. In such a scenario, a separate learning objective group may be displayed within tuning environment 100 to visually indicate "orphaned" learning objectives that require mapping.

FIG. 1A includes additional interface elements including data layer navigation menu 116. Generally speaking, a course (e.g., course 102) is the functional starting point for turning an educational data structure. However, as has been discussed previously, collections of courses form "programs," while in some embodiments, collections of programs form higher level organization structures which may include colleges, institutions, universities, educational systems, or other organizational structures. However, while the competencies, bundles, learning objectives, and other data elements are most often tied together at the course level, it is also very beneficial to see certain types of data elements across multiple courses and even across multiple programs.

Figure 2A:
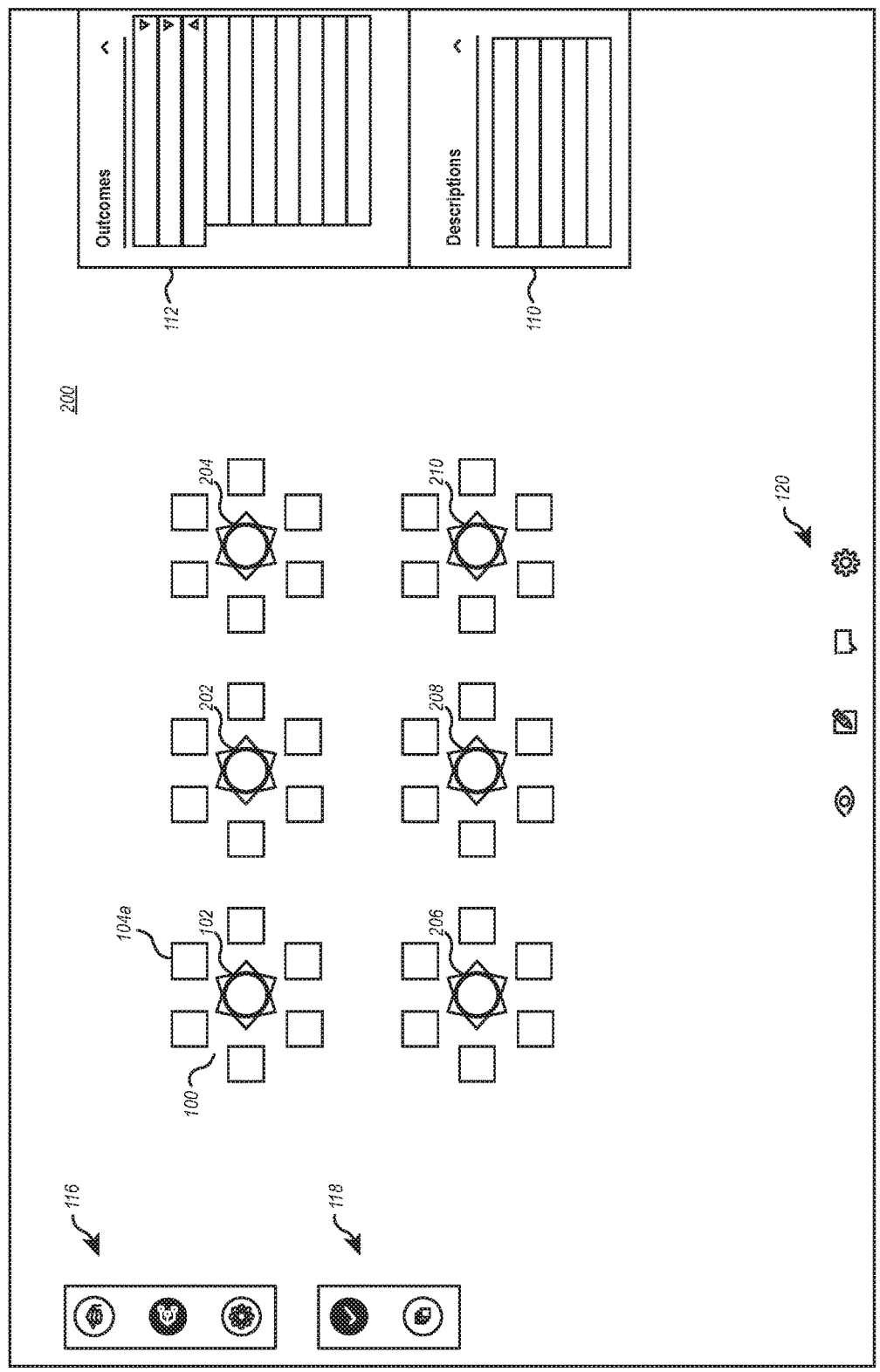
FIGS. 2A and 2B illustrate an exemplary interactive data structure tuning environment at another data level depth, according to an embodiment.
Figure 3A:
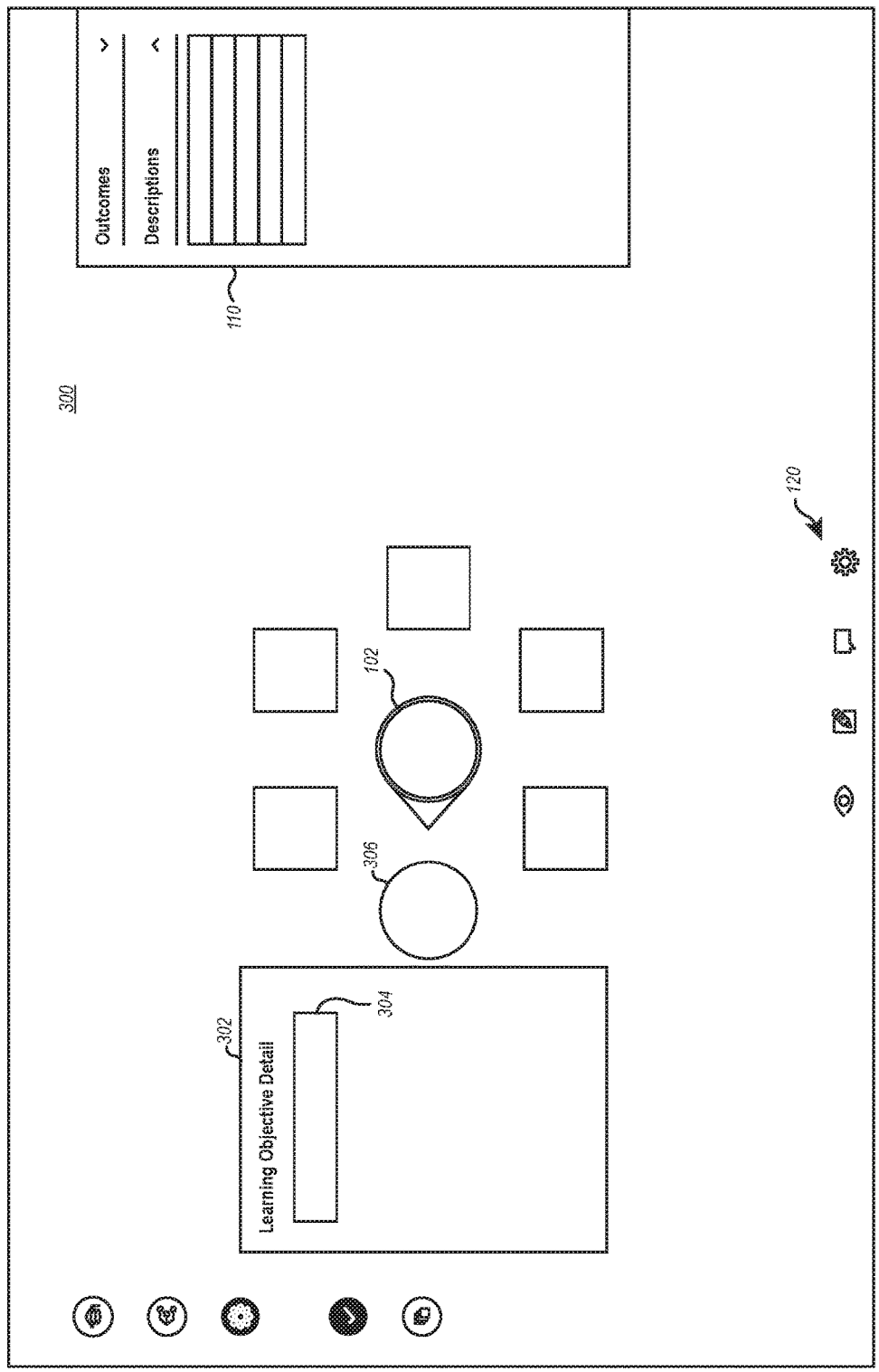
FIGS. 3A and 3B illustrate an exemplary interactive data structure tuning environment including metadata relationships and visual interrelationships, according to an embodiment.
Figure 3B:
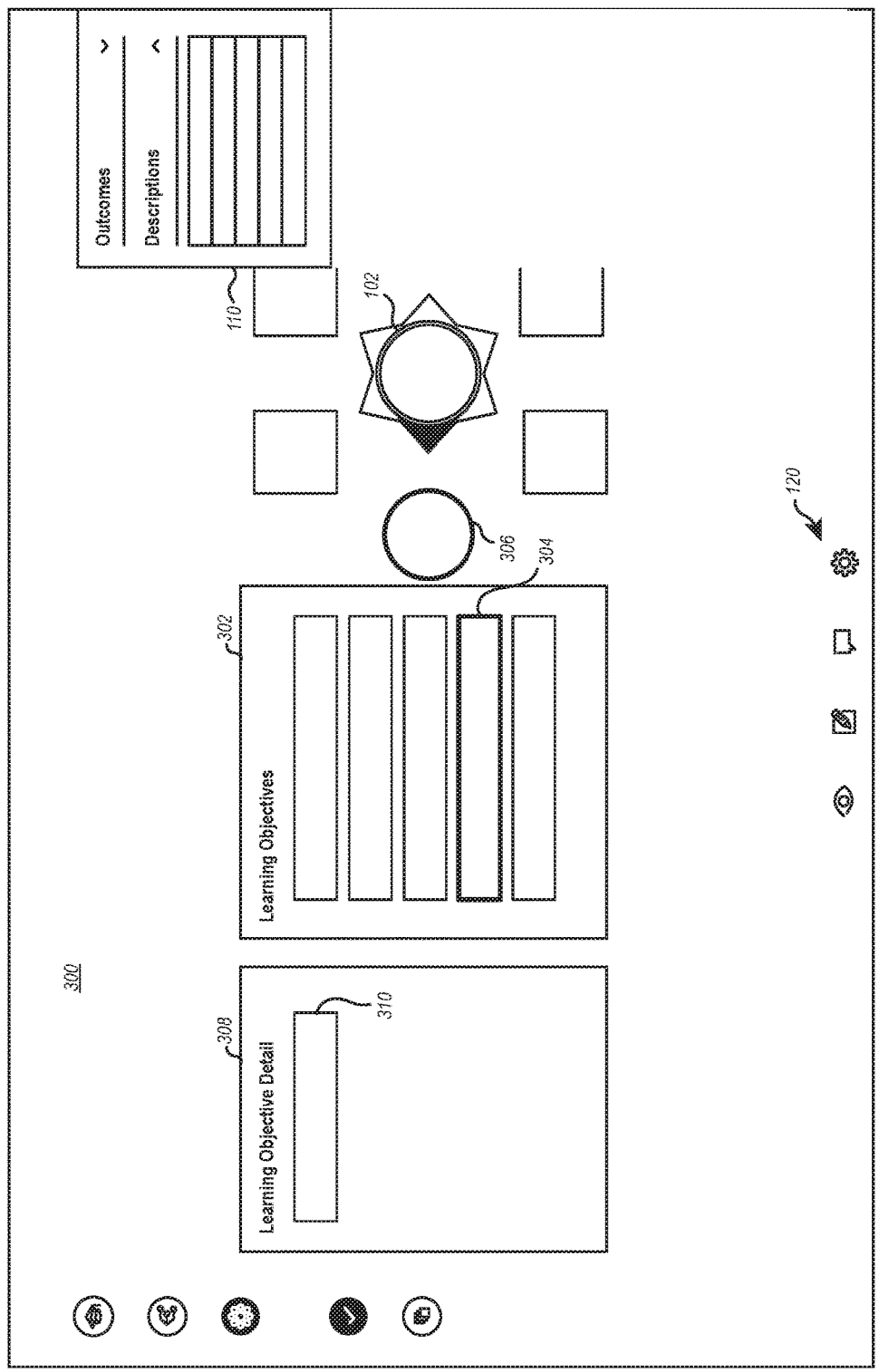

To accommodate the need to visualized data elements across course boundaries, FIG. 2A includes navigation panel 116 that includes interface elements that allow a user to select the "course level" tuning layer selector 116c (as illustrated), a "program level" tuning layer selector 116b for tuning the data structure at the program level (as illustrated in FIGS. 3A and 3B), and an "institution level" tuning layer selector 116c for tuning the data structure at the institutional or organizational level. It should be noted that in some embodiments, the navigation menu 116 may be configured differently and may include fewer, more, or different data structure tuning layers (and corresponding navigation elements.) Additionally, the navigation elements may be arranged differently, placed in a different location, or use different graphical representations. Likewise, the menu 116 may be located within an element that allows it to be moved, hidden, customized, or otherwise adapted by a user for a particular need or preference.

FIG. 1B additionally includes a learning objective grouping tool menu 118 including a competency-based grouping selector 118a and a bundle-based grouping selector 118b. Depending on the grouping selector 118 that a user selects, either competencies 104a (of FIG. 1A) or bundles 104b (of FIG. 1B) will be shown on the tuning layer 100. This is important because learning objectives, such as learning objectives 106, included within courses, such as course 102, are included within both competencies and bundles. Depending on the user, it may be beneficial to view learning objectives 106 in view of their relationship to a competency 104a of course 102, or in view of their relationship to a bundle 104b of course 102.

Regardless of which learning objective grouping selector 118 is selected, the same learning objectives 106 will be displayed. However, as is illustrated in FIGS. 1A and 1B, learning objectives, such as learning objectives 108, may be visually grouped in a different manner depending on whether a competency view or a bundle view is selected. For example, as illustrated in the embodiment of FIG. 1A, learning objectives 108 are grouped into a different quantity and arrangement as compared to their grouping within FIG. 1B. It should be noted that when switching between competency view and bundle view, any given learning objective may change position within the learning objective concentric ring 108 according to how the particular learning objective is relationally linked to respective bundle or competency. Thus, by way of implication, each learning objective 108 should be relationally linked to both a competency and a bundle in order for tuning of the data structure for the course to be complete. As such, in some embodiments, alternating between the two views may result in an orphan group being present in one view but not the other. For example, if a particular learning objective is linked to a bundle but not to a competency, that learning objective may appear within an orphan group when the competency grouping selector 118a is selected but will then be shown as grouped with the relationally assigned bundle when bundle grouping selector 118b is chosen. It is also important to note that in some embodiments, the same collection of learning objectives are present in both the competency and bundle views, but the learning objectives are visually regrouped to represent the data structure according to either a competency relationship or a bundle relationship between the particular learning objectives and the particular course.

The ability to switch between a competencies view and a bundles view provides a parallel data model for simultaneously designing both learning goals and learning delivery. It should be noted that some embodiments are configured such that adding a learning objective in one structure (e.g., to the learning objectives structure), produces a notification within another structure (e.g., the bundles structure) that the new learning objective is potentially orphaned. Said another way, in some embodiments, the simultaneous and parallel data model provides redundancy among data levels in order to ensure that data items added at one level or in one tuning environment are recognized and properly related at all other levels and in all other tuning environments.

It should be appreciated that based on the aforementioned discussion regarding competencies and bundles, in embodiments such as those in FIGS. 1A and 1B, any particular learning objective 106 includes a relational data structure linking it to both a competency and a bundle for any particular course, such as course 102. It should further be appreciated that in alternative embodiments, any particular learning objective may only be linked to a single competency or single bundle, or may be linked to multiple competencies and/or bundles within a given course.

FIG. 1B additionally includes a metadata explorer 110. Metadata explorer 110 provides additional information (i.e., descriptions) of particular items within the data structure. Metadata explorer 110 will be discussed in additional detail in conjunction with later figures.

Figure 2B:
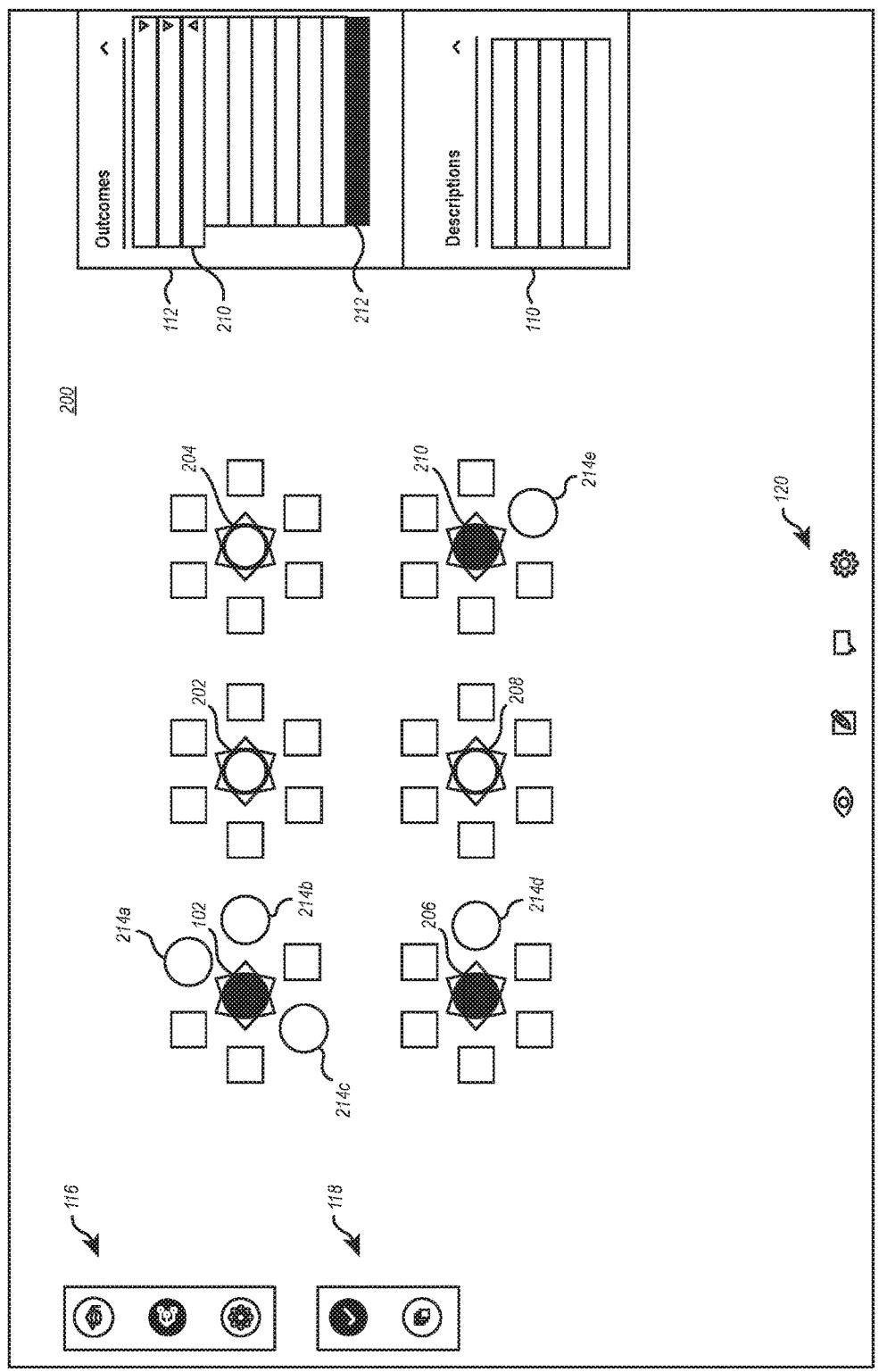

FIG. 1B also includes a data structure outcome validator 112. Within outcome validator 112 are selectable user interface items that allow a user to explore how data items are related to each of the layers of the data structure. As illustrated in FIG. 1B, outcome validator 112 includes a plurality of outcome identifiers (illustrated abstractly as boxes). In some embodiments, the plurality of outcome identifiers are relationally linked to a multi-course grouping (i.e., "Business Management IT"), a particular program (i.e., "Computer Science Program"), and/or for the institution as a whole (i.e., "University Outcome"). Each of these items within outcome validator 112 represents a different layer of the educational system data structure that includes identified outcomes. In some embodiments, each outcome includes data structure relationships with outcomes in the other layers, including relationships that skip layers (e.g., in some embodiments, an outcome within the multi-course grouping may have direct relationships with outcomes in both the program layer and the institution layer.)

Where the outcome validator 112 allows for exploring relational linking across multiple courses and/or programs, the interface illustrated by FIGS. 2A and 2B are displayed for the user. Notably, a user may invoke the program level exploration visualization by selecting an appropriate user interface element from navigation menu 116. Alternatively, in some embodiments, the interface 200 of FIG. 2A may be presented automatically when a user selects an item from outcome validator 112 that is relationally tied to multiple courses across a program.

Within interface 200 of FIG. 2A, multiple relationally linked courses within a particular program are shown, including course 102 (e.g., from FIGS. 1A and 1B), as well as courses 202, 204, 206, 208, and 210.

It is appreciated that in FIG. 2A, no options within outcome validator 112 are selected. As such, each of courses 102, and 202-210 are shown in an unadorned fashion. Further, it should also be appreciated that as illustrated by the selection from within grouping selector 116, that the layer selector has been changed as compared to FIGS. 1A and 1B. Thus, as shown, the interface 100 has transitioned to an interface 200 that shows data structures at a higher level. Still, it should be understood that the tuning environment 200 includes the same specific course 102 from tuning environment 100 that is visualized according to bundles 104b.

As with course 102 discussed in conjunction with FIGS. 1A and 1B, courses 202 through 210 also include relationally tied data elements at a competency, bundle, and learning objective levels. Thus, each of these courses can be navigated to lower levels in the same manner discussed in conjunction with course 102. For example, each of these courses 202-210 can be illustrated as having learning objectives grouped according to competencies and or bundles. Further, if one of the specific courses is selected, the tuning environment will transition into a course level tuning environment (e.g., like tuning environment 100), but for the specific course 202-210 that was selected by the user. As such, a user is able to transition back and forth between course level tuning and higher-level tuning (e.g., program level tuning).

As illustrated within interface 200, each course 102, and courses 202-210 are also relationally tied at a higher level that defines a program to which all of these courses belong. Within the outcome validator 112, each outcome layer includes one or more specific outcome links. In some embodiments, the layers may include an institutional outcome layer that includes a listing of identified institution level outcomes. It should be appreciated that other levels may be included within outcome validator 112 to allow for exploration of outcomes identified at those respective levels (e.g., program outcomes, college outcomes, department outcomes, accreditation requirements, etc.)

Broadly, outcome validator 112 provides functionality to a user for visualization of interrelationships among identified outcomes and other levels of the data structure including programs, courses, competencies, bundles, and learning objectives. Thus, outcome validator 112 provides not only a visual representation of the relationships among other outcomes at different layers, but also as a way to create and visualized relationships among outcomes and actual course structures including everything down to and including the atomized student content and experiences. In this manner, outcome validator 112 provides visualizations that extend throughout all layers of an educational system data structure to ensure that all aspects of an educational system can be appropriately related, linked, tracked, validated, maintained, or otherwise understood by any user from the unified tuning environment.

Depending on the embodiment, an outcome validator, such as outcome validator 112, may provide multiple types of data structure visualization to a user in order to aid in validating the educational system data structure. For example, outcome validator 112 may utilize text-emphasis to provide visual information to a user regarding relationships between the listed outcomes and other portions of the data structure. Specifically, the first three outcomes listed under "University Outcome" are visualized with a bolded typeface. Such an emphasis provides a user with a contextual clue that those particular outcomes have been linked or otherwise associated with another portion or portions of the data structure. The remaining listed outcomes (five outcomes) are visualized with a diminished typeface (e.g., in a lower contrast color, a smaller typeface, a level of transparency, or the like) in order to provide a user with a contextual clue that those particular outcomes are not linked or otherwise associated with another portion or portions of the data structure. In some embodiments, underlines, italics, alternative colors, symbols, or other means of emphasis may be used to distinguish outcomes that are linked or associated as compared to outcomes that are not.

FIG. 2A also includes a tuning mode menu 120. Various options within tuning mode selector 120 allow a user to toggle between various tuning modes such as a view mode, an edit mode, a commenting or collaboration mode, and an access management mode. When a user selects any of the tuning selector mode options at a given layer, one or more changes will occur to the tuning layer including the addition, removal, or alteration of available features. It should also be appreciated that a particular mode may function differently depending on the tuning layer from which it is activated (e.g., different options may be presented to a user who selects the edit mode while on a "course" layer than are presented when on a "programs" layer.) While four specific icons are illustrated within the figures, it should be appreciated that these icons are simply examples of the icons that could be used and a representative of only an exemplary embodiment of functions that can be provided. Thus, tuning mode menu 120 should be recognized as a menu that includes functions that change the mode of the tuning layer in contrast to other menus and tool bars previously described such as metadata explorer 110, outcome validator 112, layer selector 116, and grouping selector 118.

FIG. 3B more completely illustrates the function of outcome validator 112. For example, in outcome validator 112 is illustrated within a plurality of selectable elements including element 210. Within element 210, additional sub selectable elements are also illustrated. In some embodiments, element 210 may represent a broad category of outcomes that are linked to the particular learning objectives that belong to the various courses in environment 200. For example, element 210 may be linked to an outcome called "Critical Thinking." Thus, when outcome 210 is selected from within outcome validator 112, learning objectives from the courses within tuning environment 200 that are relationally linked to the "Critical Thinking" outcome are visually emphasized. Further, particular sub-components of the objective 200 may also be available. For example, element 212 may represent a sub-component of the "Critical Thinking" outcome element 210 that describes a more granular outcome.

As illustrated, element 212 of outcome validator 112 has been highlighted. As a result, various elements within tuning environment 200 have now changed relative to their state from FIG. 2A where no option was selected within outcome validator 112. For example, elements 214a, 214b, 214c, 214d, and 214e have changed from squares to circles. This visual change functions as a visual cue to a user that the changed items are relationally connected to the selected element 212. It should be appreciated that changing from a square to a circle is merely an example. In other embodiments, color, size, movement, adornments, or various other indicators, or combinations of indicators may be utilized in order to provide a visual indicator to the user that the particular data element is relationally linked to a selected element within outcome validator 112.

More specifically, as a result of selecting outcome 212, all courses and competencies (or bundles, depending on the selection made at grouping menu 118) that are relationally linked within the data structure to the selected outcome 212 are highlighted. For instance, competencies 214a-214c represent competencies that are linked to outcome 212 for course 102. It is noted that the data structure linkages between a particular competency such as 214a may be based on a direct linkage between competency 214a and outcome 212, or it may be based on an indirect linkage such as a particular learning objective or bundle relationally linked to competency 214a being linked directly to outcome 212. In most embodiments, however, the fact that a particular learning objective within a particular competency is linked to a particular outcome necessarily links the particular competency directly to the particular outcome. Further, it should also be noted that in the embodiment shown in FIG. 2B, in order for a particular competency to be linked to a particular outcome, at least one learning objective relationally linked to that competency must be linked to the particular outcome. However, in other embodiments, competencies may be linked to outcomes independently from other elements of the educational data structure. This may be helpful, for example, when different groups are planning different portions of a data structure. By allowing learning objectives to be linked directly to outcomes, such linking can occur prior to any linking of the learning objective to a competency.

Thus, it should be understood that in the embodiment of FIG. 2B, a user may use data structure outcome validator 112 to ensure that at least one learning objective within a particular competency is linked to a particular outcome even when the user cannot directly view the learning outcomes in a particular environment, such as tuning environment 100 illustrated in FIGS. 1A and 1B.

Extending this concept further, FIG. 2B illustrates that specific courses 202, 204, and 208 include no learning objectives linked to outcome 212 as there are no competencies within those specific courses that are visually emphasized. Depending on the needs of the educational system, this may represent a visual cue to a user that existing learning objectives within those courses need to be linked to the outcome, or it may represent a visual cue to a user that additional learning need to be added to those courses within particular competencies in order to tie those courses to outcome 212. However, it should also be appreciated that particular outcomes, such as outcome 212, may not have a requirement that each course include a relational link, or even that any courses provide a relational link. It should also be appreciated that while competencies 214a-214e are highlighted in tuning environment 200 as being linked with outcome 212, those same competencies are also likely to be linked with other outcomes.

Additionally, while not directly illustrated, the same visual emphasis may be illustrated for a user of environment 200 for any outcome listed within data structure outcome validator 112 including those outcomes selected for multi-course groupings, programs, or for any other layer with expressed outcomes within the educational system data structure.

Tuning environment 200 also includes metadata explorer 112. As illustrated, specific course 102 in tuning environment 200 has been selected by a user. This is visually indicated, within this example, as having the central icon for course 102 highlighted. In other embodiments, a visual indication of a selected item may be different so as to differentiate the visualization of a selected element from any visualizations utilized for other functions, such as showing relational linking to an element within outcome validator 112.

As a result of this selection, metadata explorer 110 includes "descriptions" of specific course 102 including, for example, a course name, course identifier, and a course description. It should be appreciated that any information within the data structure for the particular data item may be displayed within the metadata explorer 110. It should also be appreciated, that such metadata may be manipulated by a user within an editing environment in order to provide context about particular data items for use throughout the tuning environment. It should also be appreciated that the selection of a particular element within tuning environment 200 may result in different sorts of actions based on characteristics of how the selection is made. For example, some selections may utilize contextual clues to identify what a user is most likely to intend to occur by the selection. Such contextual clues may include the current tuning environment being visualized, the type of element being selected, or the like.

In other embodiments, different types of selection types will result in different changes to the visualization occurring. For example, a single mouse click on an element may cause metadata about the element to appear in metadata explorer 110, while a double click may invoke a level change. For example, single clicking the central element for course 202 may invoke metadata explorer 110 to show metadata about course 202, while double clicking the central element of course 202 may cause environment 200 to transition to a course level tuning environment (e.g., analogous to tuning environment 100, but for course 202.) In this manner, user selection activities may function to replace, augment, or otherwise complement the functions of tool bars or menus such as layer explorer 116 or group selector 118.

In some embodiments, metadata shown in metadata explorer 110 includes data such as course name, description, identifiers, or other like metadata. Such metadata may be able to be edited at multiple relational levels. Similarly, different metadata may be presented, as appropriate, based on the current relational level. Some metadata may be defined based on a relational linking between two data elements. For example, when a learning objective is relationally linked to a competency, the linked competency may be automatically added to the metadata associated with the learning objective. In other scenarios, a user may also be prompted to manually generate metadata for a particular element. For example, a user may be able to select an abbreviation for a learning objective or be prompted to allow the tuning environment itself select an appropriate identifying abbreviation. It should be appreciated such an abbreviation option may also be provided with other editing panes for other data points with the data structure and may likewise be relied on by a metadata explorer or other componentry within the tuning interface.

It should also be appreciated that the concepts described concerning outcome validator 112 and metadata explorer 110 with respect to the program level tuning environment 200 are also applicable to the course level tuning layer, for example tuning environment 100. In other words, outcome validator 112 and metadata explorer 110 can also be invoked when only a single course is being explored, such as course 102. Additionally, in some embodiments, because a course level tuning environment shows an additional relational data (e.g., individual learning objectives), more refined understanding of the linked outcomes can be visualized than at the program level.

In the embodiment of FIGS. 3A and 3B, the tuning environment 300 (as also exemplified in FIGS. 1A and 1B) is again illustrated in order to provide explanation of additional embodiments. Specifically, FIG. 3A includes particular course 102 and is grouped according to course competencies. In tuning environment 300, a user may directly select a given competency, such as competency 306. Upon selection, tuning environment 300 provides a visual indication or emphasis that the particular competency has been selected. At the same time, an accessory interface 302 is presented that lists the particular learning objectives contained within the selected competency 306. At the same time, metadata within metadata explorer 110 is updated to include metadata about the selected competency 306. The metadata may include any contextual information relationally linked to competency 306, including identifiers, descriptions, titles, or other data.

In this embodiment, the listing of the particular learning objectives is provided in a manner that allows a user of tuning environment 300 to select a particular learning objective within accessory interface 302, such as objective 304, in order to gain more information. Upon selection of objective 304, new accessory interface 308 is presented (as shown in FIG. 3B) and includes learning objective details 310 for the particularly selected learning objective 304. Simultaneously, metadata explorer 112 is automatically updated to include metadata specific to learning objective 304 rather than competency 306. In some embodiments, upon generation and display of accessory interface 308, accessory interface 302 may be hidden, deemphasized, moved, or otherwise altered in order to improve the user experience or perform some other function. However, as illustrated in FIG. 3B, in some embodiments, a sequence of accessory interfaces may be displayed to provide a bread-crumb visualization to the user to help visualize where the user is in exploration. Such embodiments may be beneficial to a user to provide a context of the linkage trail between a particular learning objective all the way back to a specific course. In some embodiments, tuning interface 100 may include the ability to visualize the data according to both methodologies either by differing user selection methods, user selected preferences, or automatic determinations by the tuning interface according to criteria such as screen size, device type, tuning mode, or the like.

Figure 4:
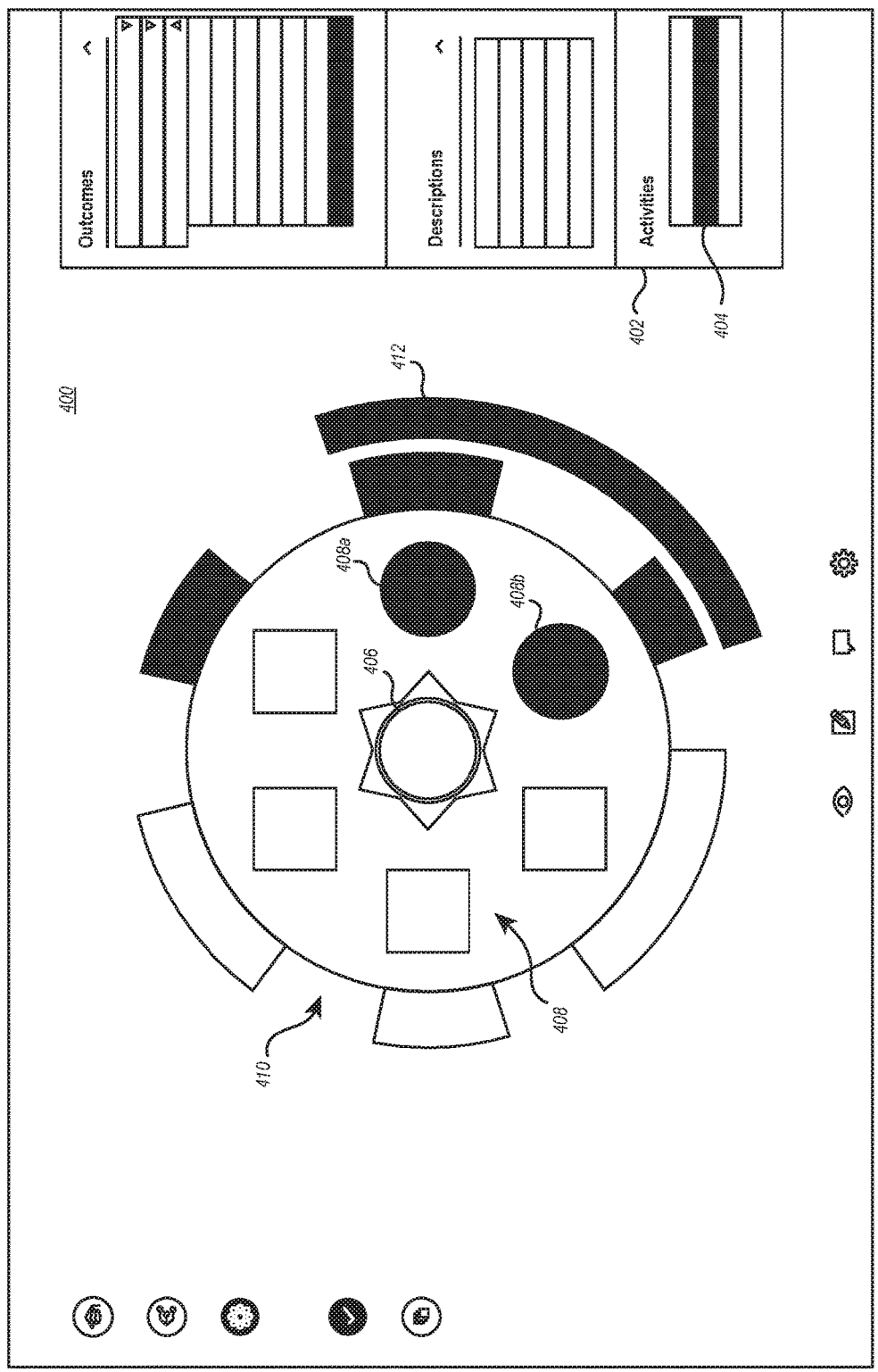
FIG. 4 illustrates an exemplary interactive data structure tuning environment for visualizing interrelationships between differing data structure levels, according to an embodiment.

FIG. 4 introduces a tuning environment 400 that includes an additional concept of an activities explorer 402. Within activities explorer 402 are a plurality of activities including activity 404. As illustrated, activities explorer 402 may be presented as a menu item in conjunction with other user interface elements such as the previously described metadata explorer 110 and outcome validator 112. It is also appreciated that FIG. 4 illustrates a particular course 406, a series of competencies in a first concentric ring (labeled as a group 408), and a plurality of learning objectives in a second concentric ring (labeled as a group 410). As will be appreciated, these concepts have been described previously, for example in conjunction with tuning environment 100.

Tuning environment 400 includes an additional relational visualization linked to activities explorer 402. This additional relational layer is visualized as an additional concentric ring that at least partially surrounds the learning objective ring group 410. In so doing, a user is able to select an activity, such as activity 404 from activities explorer 402, to be presented with a visual representation of the learning objectives (and by extension, the competencies or bundles associated with those learning objectives) that are linked to the selected activity.

By way of example, activity 404 may be representative of an exam, report, field trip, presentation, or other learning activity that encompasses the concepts or content represented by one or more learning objectives. For example, assume activity 404 represents a "book report" activity and is labeled as such within activities explorer 402. When a user at tuning environment 400 selects the "book report" activity 404, a new activity related concentric ring appears. For example, activity identifier 412 is presented. As illustrated, activity identifier 412 encompasses one or more of the learning objectives relationally linked to competencies 408a and 408b. This is visually presented both as a partial concentric ring that spans the area occupied by the learning objectives linked to competencies 408a and 408b, and also by highlighting or shading the related learning objectives, competencies, or bundles. It should be appreciated that while activity identifier 412 is illustrated as a continuous portion of the partial concentric ring, there is no requirement that a particular activity only encompass adjacent learning objectives. For example, a particular activity may be shown as multiple distinct portions of an incomplete concentric ring when the activity includes learning objectives from competencies or bundles that are not presented adjacently.

It should also be appreciated that more than one activity may be shown at a time. In some embodiments, a single concentric ring may be utilized to simultaneously illustrate multiple activities. In other embodiments, new concentric ring layers may be introduced for each selected activity. For example, the "book report" activity identifier 412 may be shown at a first activities concentric ring level, an exams activity identifier may then be presented (when selected at activity explorer 402) as a new concentric ring level beyond the activity identifier 412. Likewise, field trips may present an additional concentric ring layer, and presentations another concentric ring layer. In this manner, learning and assessment activities can be tracked and learning objectives visualized to identify whether and how particular learning objectives are being presented through which types of learning and assessment activities.

Further, consistent with prior disclosure, the relational linking of abstract data elements (e.g., learning objectives, bundles, competencies, etc.) to learning and assessment activities can also be modified within tuning environment 400 by invoking an edit command as has been previously described. As but some examples, a user may link a learning objective to an activity by selecting the learning objective and modifying the metadata within a metadata explorer. Alternatively, a user may drag a learning objective onto a specific activity within activities explorer 402 to link that learning objective to the specific activity.

In some embodiments, lengthy metadata fields may be truncated into topically precise descriptors for use in contexts where space savings may be desirable. In such embodiments, a tuning interface, such as that exemplified in FIG. 6C, may identify a particular metadata tag and attempt to provide a shorter, topically relevant, keyword pairing. In some embodiments, this is accomplished through algorithms that take into account parts of speech of particular words within a metadata field in order to pick the words most likely to be relevant to a particular tag. In other embodiments, machine learning and historical tagging may be used to assist the process of selecting a shortened tag. In some embodiments, once the tuning interface has produced a shortened metadata tag, a user is able to refine, change, delete, or otherwise modify the chosen tag. In some embodiments. In embodiments such as the one illustrated in FIG. 6C, a keyword pair is utilized. In other embodiments, a single word may be selected, or in other embodiments a variable number of words may be used.

Figure 5A:
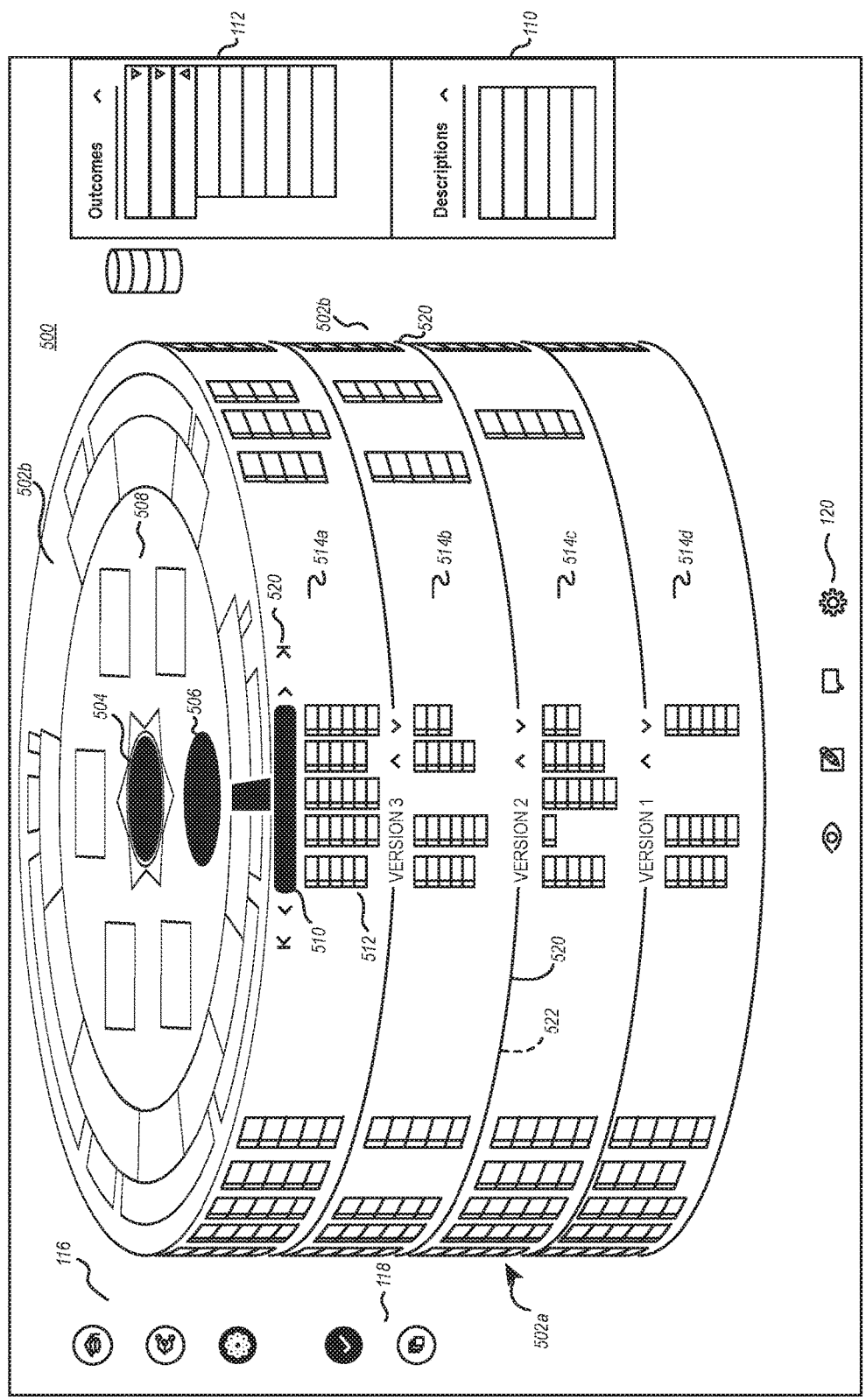
FIGS. 5A and 5B illustrate an exemplary interactive data structure tuning environment for visually exploring historical versions of course data structures, according to an embodiment.
Figure 5B:
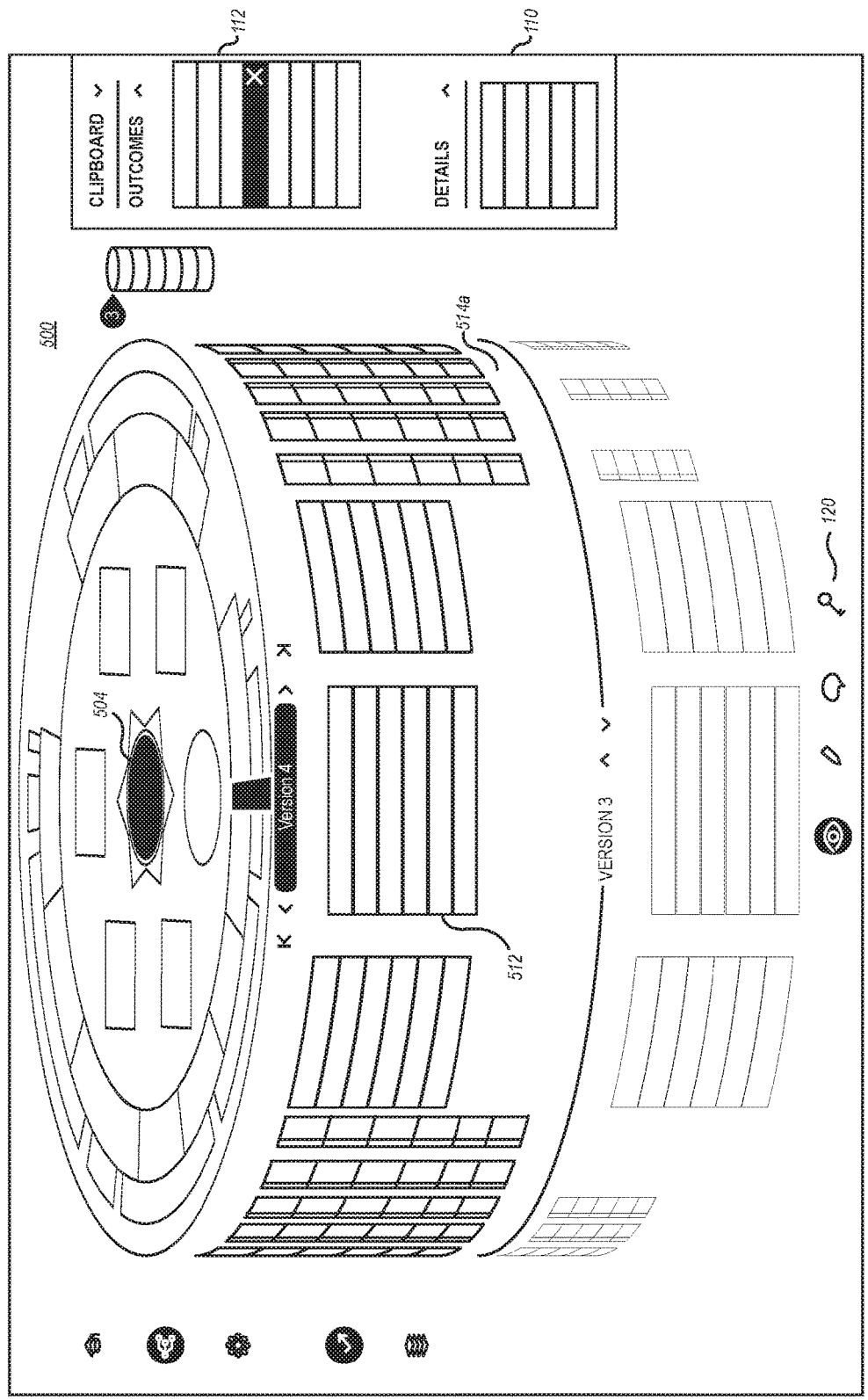

Moving now to FIGS. 5A and 5B, a three-dimensional columnar tuning environment is illustrated. FIG. 5A includes 3D columnar tuning interface 500. It should be appreciated that tuning interface 500 may be presented in conjunction with the other tuning interfaces described in conjunction with earlier figures, for example by invoking the 3D visualization through a menu item selection, gesture, contextually relevant selection, or the like. The columnar tuning interface 500 includes a vertical visualization axis 502a for visualization of a particular course 504 according to tuning interfaces analogous to those discussed previously. Within the particular course 504 is a competencies region 506 and a learning objectives region 508. As can be appreciated in FIG. 5A, the tuning interface has been shifted relative to the tuning interfaces of prior figures in a manner that produces both a three-dimensional visualization aspect as well as in a manner that produces a new axis of visualization along axis 502.

It should be appreciated that while axis 502 is described as a new vertical visualization axis, the applicable visualization should be understood to exist within a two-dimensional plane of a computer system display. However, the creation of the new axis 502 creates a simulation of a three-dimensional visualization. This is accomplished by modifying the presentation of the data visualization discussed previously in conjunction with FIG. 1A and FIG. 1B to be located with a simulated X axis (e.g., left to right), as well as a simulated Z axis (e.g., forward to rear). Thus, in some embodiments, the axis 502 then becomes a simulated Y axis (e.g., top to bottom).

For example, the visualization of the particular course 504 simultaneously includes visualizations along the vertical axis 502a as well as on a plane 502b that is visualized as being located at the top of a three-dimensional columnar tuning interface. In this manner, data elements are visualized along a vertical axis, and some data elements are simultaneously visualized with a plane transverse to the vertical axis. The portion 502b of the visualization should be understood to be analogous to other tuning interfaces previously discussed (e.g., tuning interface 100 of FIG. 1A). However, it is also clear form FIG. 5A, that a new vertical axis 502a for visualization of data layers is now shown.

Within vertical axis 502a, additional information about specific course 504 can be provided. For instance, axis 502a includes historical data about course 504 in the form of versions 514a-514d of course 504. As such, it should be appreciated that tuning interface 500 provides a user with a visualization showing four distinct versions of specific course 504 have historically existed with the educational system data structure. Further, within each specific version, such as version 514a, a user can navigate among the various competencies that comprise the version. For instance, version 514a illustrates competency 510. A user may navigate in a circular fashion using navigation controls 520. For instance, if a user selects a control pointing to the right, the columnar visualization 500 will rotate in a manner that the next competency within specific course 504 will be shown for all versions 514a through 514d. In some embodiments, a gesture or other command may be utilized in order to manipulate the columnar visualization 500 to rotate about vertical axis 502a.

Vertical axis 502a also includes an historical data area 512 for each competency, such as competency 510. Depending on the competency shown, historical data area 512 provides a user with information relevant to that particular competency for that particular version. In this manner, a user is able to visualize not only specific historical data about specific versions, but is also able to derive, visually, differences among versions of a course over time.

As an example, visualization axis 502a illustrates that current version 514a of specific course 504 includes five learning objectives within the "create databases" competency 510 (illustrated as the five vertical columns within data area 512). However, as is illustrated on axis 502a, version 514b of course 504 included only four learning objectives for the particular competency 510 (illustrated as the four vertical columns within the analogous data area of version 514b). Moving back in time, version 514c is shown to have had five learning objectives for competency 510, while version 514d included only three learning objectives.

Additionally, historical data area 512 also includes additional information about the specific learning objectives themselves. For instance, within area 512 for course version 514a, the first column (representing the learning objective located in the corresponding position on visualization 502b), is subdivided into distinct regions representing different activities associated with discussion, modifications, or other data structure adaptations performed in relation to the particular learning objective during the particular course version.

This information can aid a user in ascertaining how and why a particular course (or competency or learning objective) has been altered over time. For instance, axis 502a illustrates that the third learning objective was dropped between versions 514c and version 514b. It can also be noted that the historical data area 512 corresponding to learning objective three at version 514c includes numerous indications of discussion, modifications, and/or other data structure adaptations relating to learning objective three. Additionally, in some embodiments a user can select the items within historical data areas for each version that corresponds to data area 512 to view the discussion, change, or other detail that was occurring within that version for that data item (e.g., learning objective.)

Further, as shown in FIG. 5B, the region 512 may be altered to include different information or to provide the same information in a different manner. For instance, FIG. 5B represents an environment similar to that shown in FIG. 5A but oriented in a manner where the current version has been selected and visually emphasized or isolated from the other versions. By doing this, a user can see particular historical information about a particular course for each particular competency (or bundle, as has been discussed previously) and for each particular learning objective.

For instance, within tuning environment 500 of FIG. 5B, version 514*a* of specific course 504 is illustrated. The three-dimensional rotatable interface is oriented such that a particular competency of course 504 is receiving focus with a particular learning objective within the competency displaying historical data 512. As opposed to the historical data 512 of FIG. 5A, here, the historical data 512 is shown in text form (although color coding and other indications may be alternatively or additionally used in some embodiments.)

Historical data, such as data 512 illustrated in FIGS. 5A and 5B, may also be visually emphasized using color-coding to indicate visually the type of activity associated with the particular learning objective for the particular version. For example, one color may be used to indicate implemented suggestions about a learning objective, another color to indicate rejected suggestions about a learning objective, and another color to indicate active suggestion conversations about a learning objective. As was discussed previously, conversations may be included within the tuning structure as educational designers are performing the work of creating, linking, and organizing the educational data structure for a particular course, program, or other layer as has been discussed. These conversations may occur between or among many members of a development team. The conversations may be linked to a specific learning objective, bundle, competency, activity, assessment, or any other data element within the data structure. In so doing, historical information (e.g., decisions, rationale, comments, etc.) about a particular choice can be tracked and reviewed at any time. This is particularly helpful when future variations or versions of a course are being developed.

Notably, historical information can also include automatic metadata tracking. For example, historical data may also include information such as who linked a particular data element to another data element, past elements a data element has been linked to, or other transactional information that occurs within the tuning structure.

It should be recognized that historical data can also be expressly added by users within user interface elements within the tuning structure. For example, as was discussed in conjunction with FIG. 3A and FIG. 3B, selecting particular elements within the data structure may present additional user interface elements that allow users to add, edit, or remove data linked to a particular element. In some embodiments, conversations about a particular data element may be tracked within these additional user interface elements.

In other embodiments, an integrated chat feature may also be included within the tuning environment. There, conversations among users could be consolidated while still allowing conversations to be directly linked to particular data elements within the tuning structure.

In some embodiments, colors may also be included in order to indicate changes to content within a learning objective, to indicate changes to an assessment, or to indicate new content was added for the learning objective. It should be appreciated that such a color and indication is but one example. Other embodiments may use symbols or other visual indicators to augment or replace color-coding. It should merely be appreciated that historical area 512 provides a visualization for historical data contained within the educational system data structure for a particular learning objective of a particular competency/bundle of a particular course to be visualized over time from version to version.

Additionally, as with many other aspects of the tuning environment, in some embodiments utilizing discussions to tune a course structure will include synchronous editing capabilities. Such capabilities allow users to interact with each other in real time within the tuning environment in order to improve a given data structure. As will be discussed later, historical discussions surrounding elements of the educational data structure can be invaluable throughout the existence of the course. For example, conversations about why a certain decision, revision, relational link, etc., were made in a prior version of a course can become valuable during creation of later versions of the course. Thus, by enabling the linking of discussions directly to the data elements that are the subject of the discussion, a great deal of contextual information can be maintained for course elements across time.

Another aspect of the three-dimensional tuning environment is that a user can also visually separate the various versions of a particular course in a manner that allows them to see "between" the versions. For example, a user may indicate to the tuning environment a desire to see what the course specific visualization for specific course 504 looked like at version 514*c*. Upon making the indication, the three-dimensional columnar visualization would separate at the line 520 in a manner that allowed the user to "peek" between the two layers to see historical tuning environment 522 that existed for course 504 during version 514*c*. As a result of the peek action, the columnar visualization would generate a new transverse plane to include the underling competencies/bundles and learning objectives that existed for course 504 during version 514*c*. This new transverse plan would be analogous to the plan 502*b*, but include historical data rather than current data.

A user may then take further action to engage tuning environment 522 in a manner that causes that environment to be represented in a two-dimensional tuning environment analogous to those in FIGS. 1A and 1B. Other interface capabilities may also be included within three-dimensional tuning interface 500 according to different embodiments.

Finally, the three-dimensional tuning environment visualization, such as that shown in FIGS. 5A and 5B, may be engaged or otherwise activated by a user form a different tuning environment such as those shown in previous figures. Additionally, such an activation may be done through a menu bar presented on the user interface (e.g., such as at data layer navigation 116 of FIG. 1A) or may be activated in some other manner (e.g., a touch gesture, mouse motion, or other indication from a user.)

It should also be appreciated that the columnar navigation environment 500 shown in conjunction with FIGS. 5A and 5B is enabled to allow a user to interact with different versions of a course. Course versioning encompasses the idea that the current implementation of a course may be different from prior, historical implementations. However, generally speaking, there is only one version of a course that is active within a program at a given time. This is conceptually important in view of FIGS. 6A and 6B that represent course variations.

Unlike course versions, there may be multiple variations for a given course that simultaneously exist and are active within an educational data structure. This is because when learning objectives change over time, new versions are required. However, if learning objectives are merely rearranged, redistributed, or otherwise presented differently in some implementations of a course, a new variation is present as opposed to a new version.

Figure 6A:
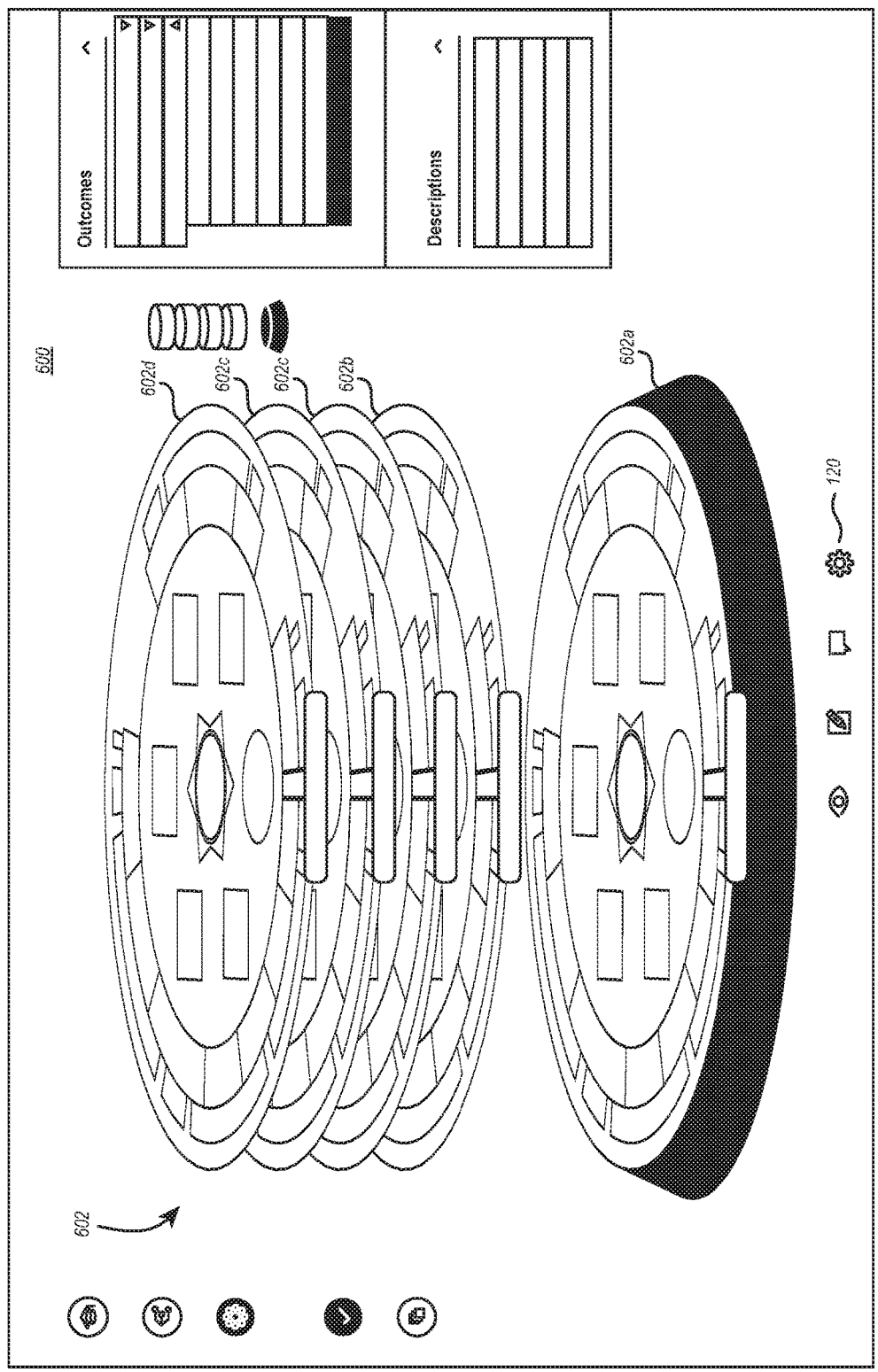
FIGS. 6A and 6B illustrate an exemplary interactive data structure tuning environment for visually exploring variations of course data structures, according to an embodiment.
Figure 6B:
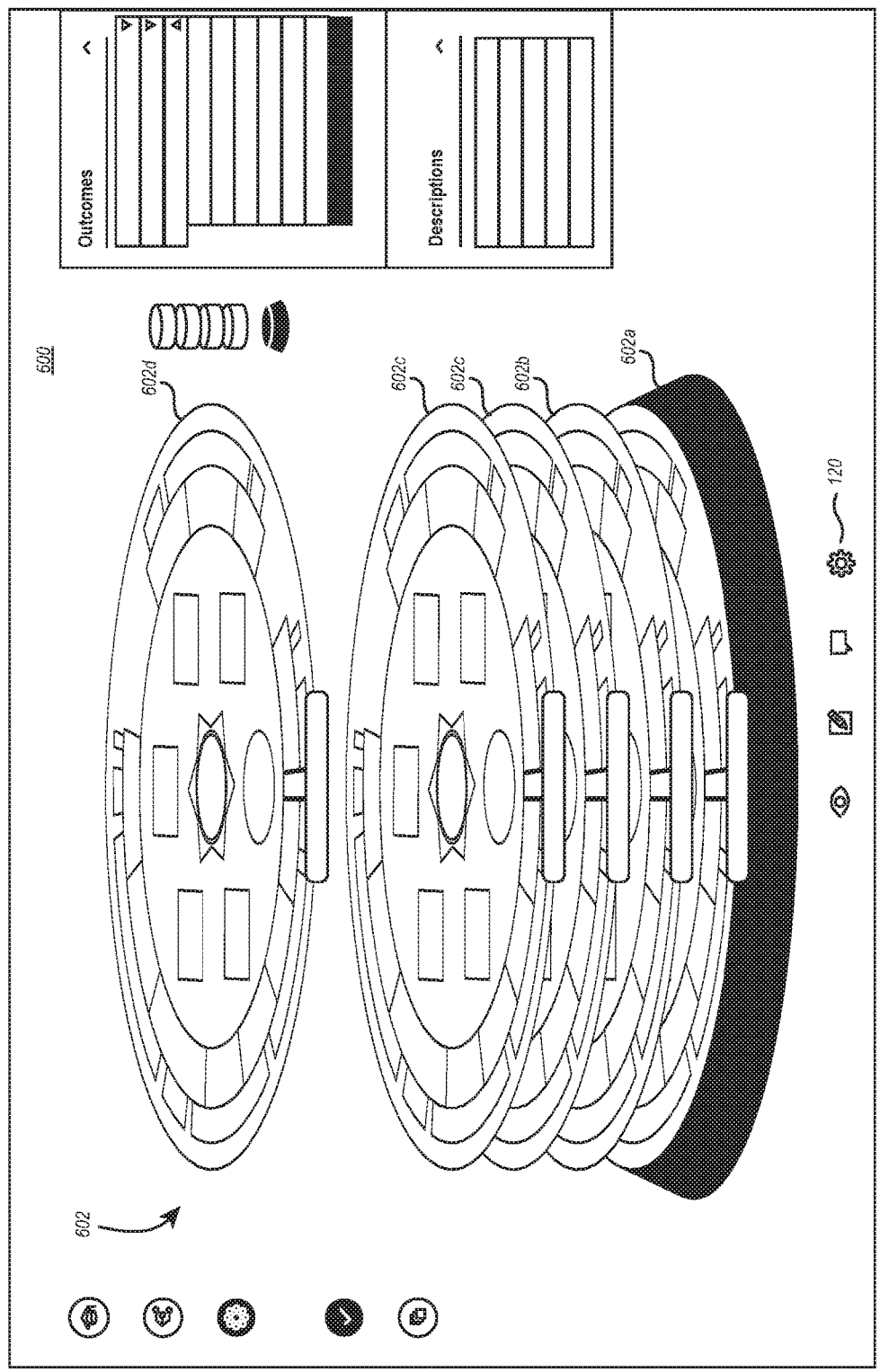

For example, FIG. 6A illustrates a variation navigator 600 that presents multiple variations for a course 602. Notably, the illustration includes a base layer 602a and four variations labeled 602b, 602c, 602d, and 602e. It should be appreciated that base layer 602a is considered "locked" and is analogous to the other visualizations of a course such as course 102 of FIG. 1.

When a variant of course 602 is desirable, the variation navigator 600 may be invoked by a user using a menu item, gesture, or other input at the tuning interface. In some instances, when a user edits an aspect of a data element in another interface (for example, if a user edits metadata associate with a data element to change a relational linking), the user may be presented with the option to generate a new variation of the course.

Once the variation navigator 600 is presented, the user is able to interact with and visualize one or more existing variations of the current course. As was discussed with FIGS. 5A and 5B, this interaction may provide the ability to compare versions, manipulate information about a particular version, or other abilities. One specific ability available to a user of variation navigator 600 is the ability to select a particular variation and perform a "peek." By invoking a peek, the complete data structure for the particular variation is presented to the user. Notably, a user may exit a peek back to the main variation navigator using input of various sorts.

It should be appreciated that variations may be related to different delivery domains for a course. In some embodiments, variations 602b through 602e may be based on different time domains for delivering course 602. For example, base layer 602a may be locked as a traditional semester long delivery time domain for course 602. 602b may be a shortened delivery time domain, such as for a shortened summer semester. 602c may represent an intensive seminar delivery time domain, such as for delivering the entirety of course 602 over an intensive two-week version of the course. It is appreciated that these exemplary time-domains are just examples and that others may be applied. Additionally, it should be appreciated that each course variation need not be made according to a unique time domain. For example, multiple variations may exist according to a summer semester, intensive seminar, self-paced, or other time domain.

Variations may also be related to different delivery domains for a course with respect to delivery platform. For example, base course may be locked for traditional, in-person course delivery. 602b may be configured for online delivery. 602c may be configured to mixed environment delivery. 602d may be configured for self-paced delivery. And 602e may be configured for a combination of different delivery types. As with time domains, there is no requirement that each delivery domain variations be unique from other delivery domain variations, only that the relational linking among the data elements tied to a course be assigned, grouped, organized, or otherwise arranged differently from another variation.

It should also be appreciated, however, that whether the variations are time domain based or delivery domain based, each variation includes all of the elements of the base course. Thus, unlike a version where the set of learning objectives have been modified necessitating a new version, variations exist when the delivery of the learning objectives has been reconfigured (but not added or removed.) Thus, while only a single version of a course can exist at a given time within a particular program, many different variations of a course can simultaneously exist for the same course within a particular program.

Accordingly, navigating and modifying educational system data structures in this way is a great improvement upon traditional methods with respect to user efficiency, accuracy, and interrelational understanding. However, less apparently, such embodiments also provide improvements to computing system efficiencies by reducing the resource intensive nature of prior systems that involved numerous different applications simultaneously executing to provide similar functionality. Further, by avoiding the requirement to switch between multiple different interfaces, computing systems encounter far fewer resource intensive interrupts that are known to be excessively costly in terms of processor performance, clock cycles, and other computing efficiency metrics. The present embodiments also provide computing improvements through data security and reliability by consolidating data within a centralized structure. This improves the ability to ensure data backup and security of the data by allowing for a centralized data storage. Contrasted with prior art systems requiring differing computing applications with multiple stand-alone files within each application, the present embodiments clearly represent improvements to the technical field for educational system data structure planning, management, maintenance, and visualizations.

Additionally, such embodiments also allow educational system data sets to be extremely scalable, as a centralized data structure can be optimized for the particular types of data and interrelationships that form an educational system.

Figure 7:
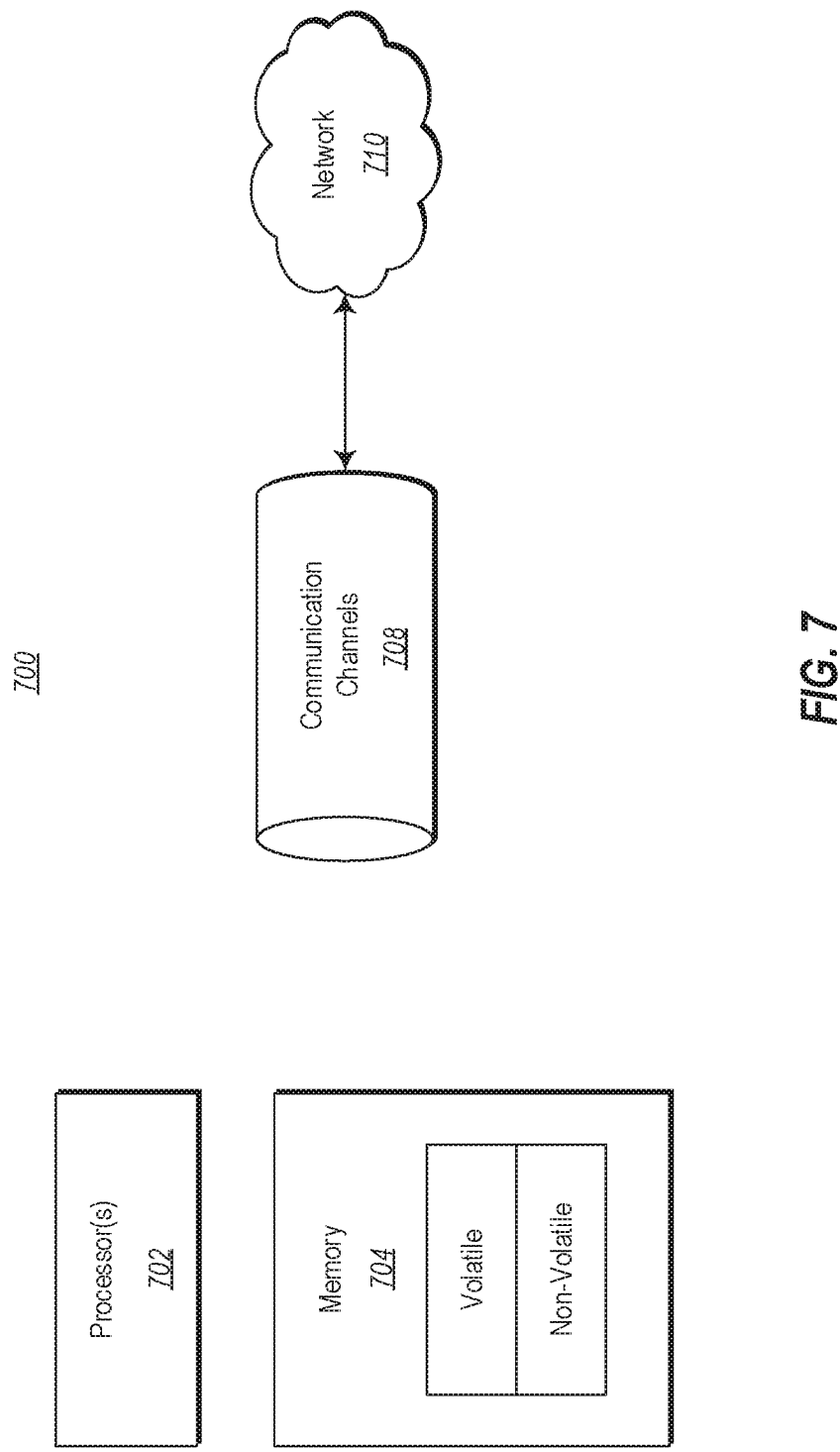
FIG. 7 illustrates an exemplary computing system configured to implement the embodiments discussed herein.

Each of the previously described visualizations and educational data structure tuning environments are executed at computer systems that are configured to execute computer executable instructions that include executable code configured to produce the features described herein. For example, as illustrated in FIG. 7, in its most basic configuration, a computing system 700 typically includes at least one hardware processing unit 702 and memory 704. The memory 704 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system 700, whether such an executable component exists in the heap of a computing system, or whether the executable component exists on computer-readable hardware storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component."

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component," and thus also have a structure that is well understood by those of ordinary skill in the art of computing.

In the description that preceded and in the examples that follow, embodiments are described with reference to steps that are performed by one or more computing systems. If such steps are implemented in software, one or more processors (of the associated computing system that performs the steps) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface for use in interfacing with a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, holograms and so forth. Examples of input mechanisms might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media. Additionally, storage media can comprise both tangible, hardware storage media as well as temporary storage media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). Additionally, cloud computing environments allow some or all of the capabilities of the embodiments described herein to be practiced by multiple users, synchronously, from different locations. In some embodiments, synchronous system utilization includes a real-time video, voice, or chat interface, screen sharing, or other real-time or near-real-time collaborative capabilities. The definition of "cloud computing" is not limited to any of the other numerous advantages that can be obtained from such a model when properly deployed.

Figure 8:
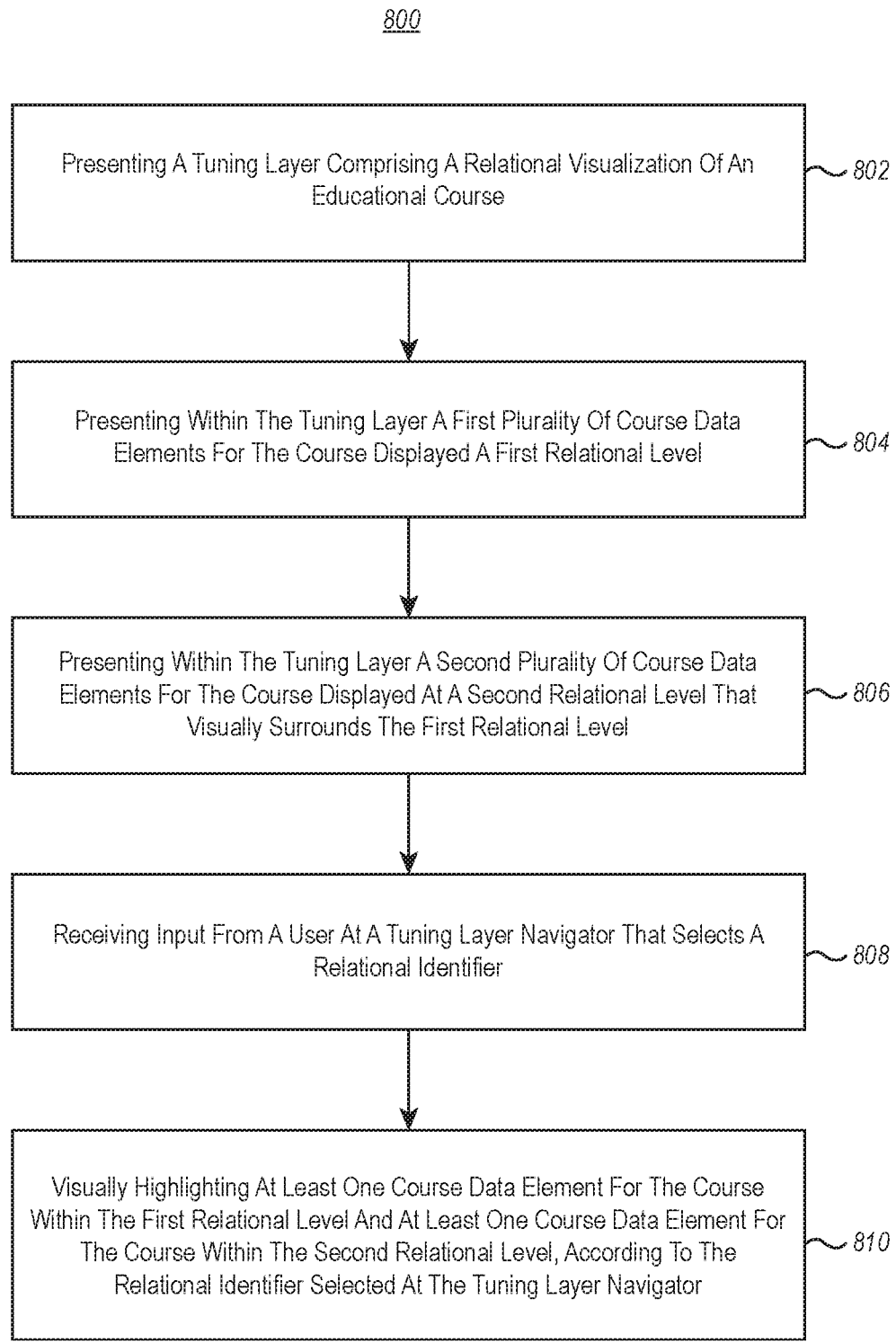
FIG. 8 illustrates a flowchart of an example method for tuning an educational system data structure in an interactive computing environment.
Figure 9:
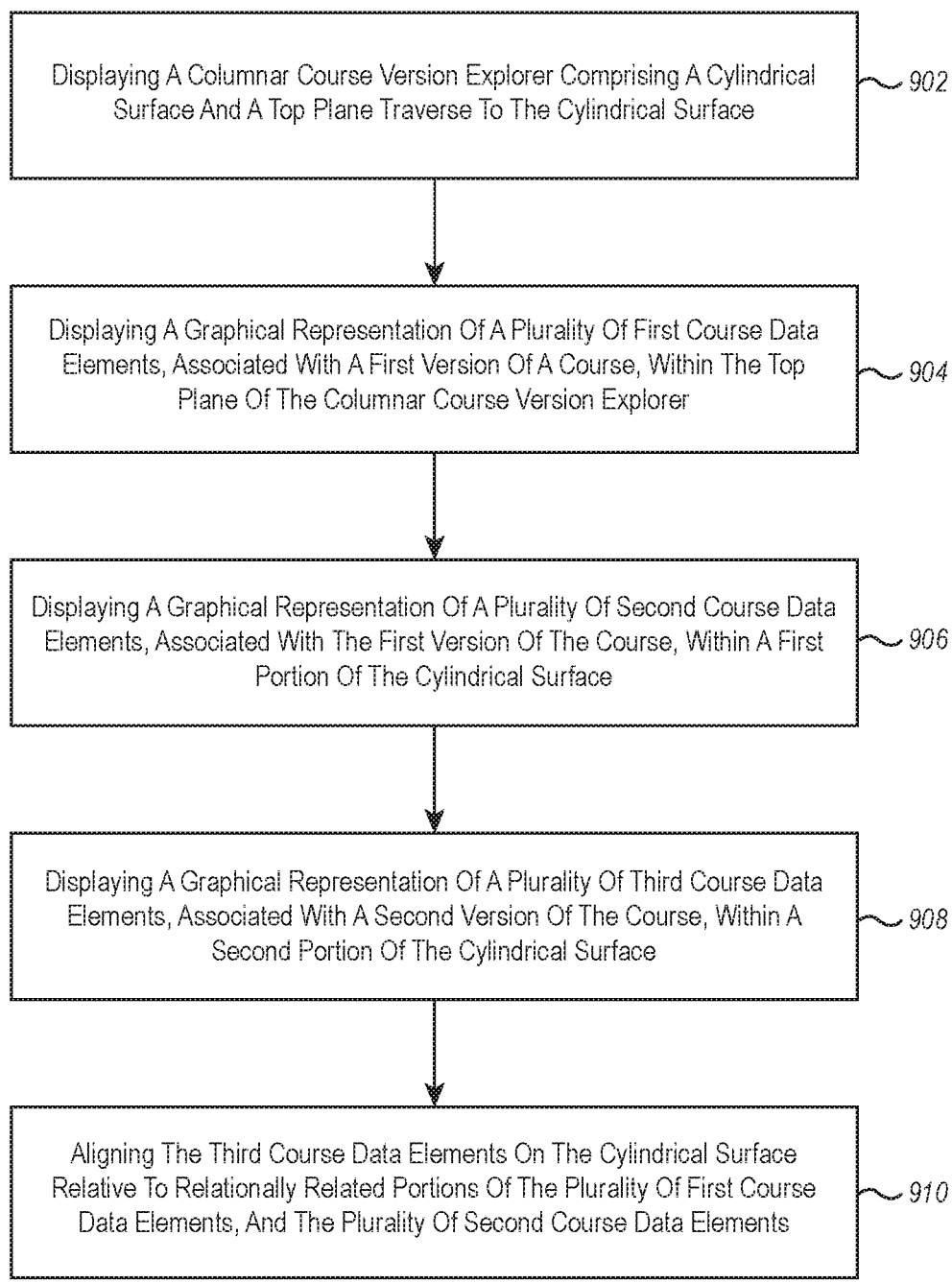
FIG. 9 illustrates a flow chart of an example method for tuning an educational system data structure using a multidimensional visualization.
Figure 10:
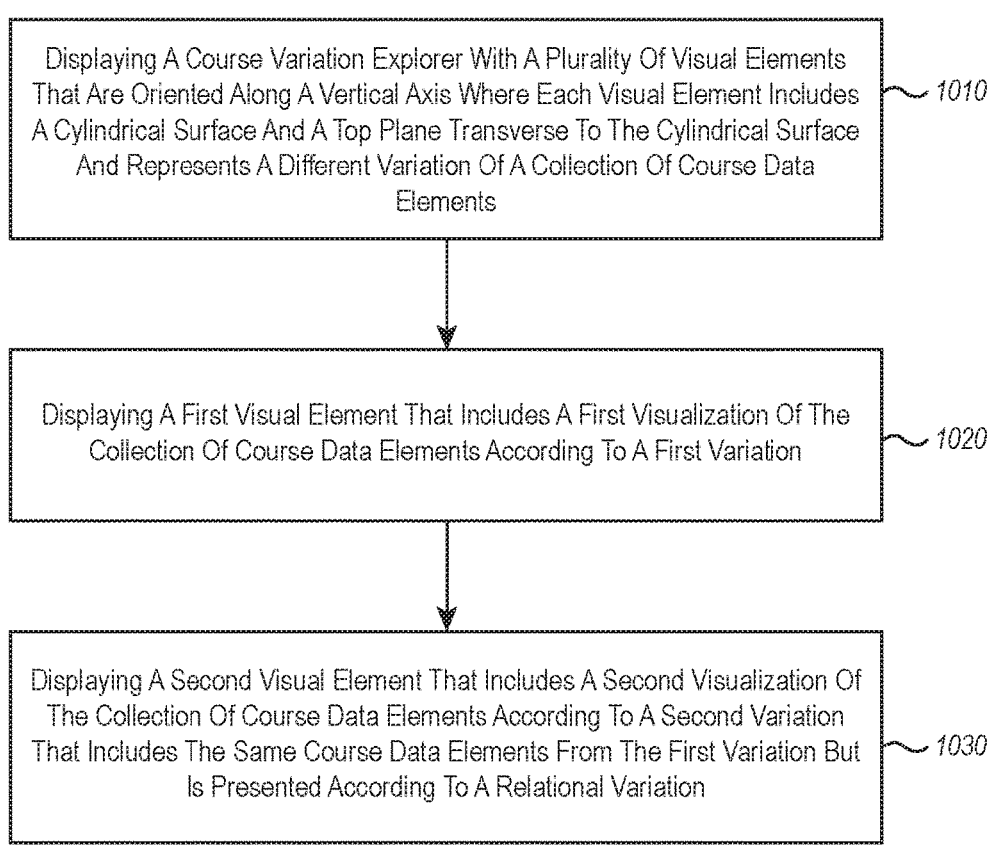
FIG. 10 illustrates a flow chart of an example method for displaying a multidimensional visualization for graphically representing relationships among a plurality of course data.

In FIGS. 8, 9, and 10, three exemplary methods are described with reference to one or more steps that are executed by a computer system in order to accomplish the particular aspects of the step.

In method 800, a tuning layer is presented, at a display of a computer system, that includes a relational visualization of an educational course (step 802). For example, the tuning layer presented at step 802 may be the tuning layer 100 described in conjunction with FIGS. 1A and 1B.

Within the tuning layer, a first plurality of course data elements are presented for the course which are displayed at a first relational level (step 804). For example, the first plurality of course data elements may be the competencies 104a or the bundles 104b discussed in conjunction with FIGS. 1A and 1B. Additionally, as has been previously described, the first relational level may be signified by the concentric ring visualization that places the competencies 104a or bundles 104b in a manner that visually surrounds the central course identifier icon.

Next, a second plurality of course data elements for the course are presented within the tuning layer at a second relational level that visually surrounds the first relational level (step 806). For example, the second plurality of course data elements may be the learning objectives 108. As has been previously described, the second relational level may be signified by the concentric ring visualization that places the learning objectives 108 in a manner that visually surrounds at least a portion of the concentric ring that defines competencies 104a or bundles 104b.

Next, an input is received from the user selecting a relational identifier at a tuning layer navigator (step 808). Such a user input may be a user input like that described in conjunction with 2A and 2B including user input received at outcome validator 112 or metadata explorer 110.

Finally, at least one course data element for the course within the first relational level and the second relational level are visually highlighted according to the relational identifier selected at the tuning layer navigator (step 810). For example, as described in FIG. 2B, upon selection of an element within outcome validator 112, portions 214a, 214b, and 214c (among other portions) are visually highlighted by changing the shape of those elements.

In some embodiments of method 800, an additional, different, input is received from the user at the tuning layer navigator that is interpreted by the computer system as an input selecting a different relational identifier, such as a different element within outcome validator 112. In some embodiments, based on receiving the different input, different course data elements are visually highlighting within the first relational level and the second relational level according to the different relational identifier selected at the tuning layer navigator. Importantly, as has been previously described, selecting a different input in outcome validator 112 does not necessarily highlight only previously non-highlighted elements. Rather, some highlighted portions may overlap with the highlighted portions from the previous selection.

In some embodiments of method 800, a course data element grouping visualization is presenting at the first tuning layer. This grouping may be displayed at a third relational level that visually surrounds the second relational level and that is presented based on receiving user input at the tuning layer navigator. For example, as was discussed in conjunction with FIG. 4, one or more activities may be selected from an activities menu 402. In some embodiments, such activities function as groupings of other course data elements, such as learning objectives, competencies, or bundles.

In some embodiments of method 800, a course data element grouping visualization is configured to provide a visual representation of a characteristic relationally tied to at least one course data element for the course within the first relational level and at least one course data element for the course within the second relational level.

In some embodiments of method 800, the relational visualization is a first relational visualization and the method further includes displaying the first relational visualization at the display as a substantially circular visualization such that the first plurality of course data elements for the course are arranged as a first concentric circle and the second plurality of course data elements for the course are arranged as a second concentric circle visually surrounding the concentric circle of the first plurality of course data elements.

In some embodiments of method 800, additional user input is received in the form of a command to visualize one or more additional versions of the course. As has been discussed previously, course versions represent historically different combinations and arrangements of course data elements. When such a user input is received, a visual transition may be performed transitioning from the substantially two-dimensional tuning layer visualization (e.g., as shown in FIG. 1A) to a substantially three-dimensional columnar tuning layer visualization (e.g., as shown in FIG. 5A). In some embodiments of such a columnar tuning layer visualization, a columnar course version explorer is presented that includes a cylindrical surface and a top plane traverse to the cylindrical surface. In some embodiments, a graphical representation of a first version of a course is presented that includes the plurality of first course data elements and plurality of second course elements displayed within the top plane. In some embodiments, a plurality of third course data elements are also displayed within a first portion of the cylindrical surface such that the plurality of third course data elements are aligned on the cylindrical surface relative to relationally related portions of the plurality of first course data elements and the plurality of second course data elements within the top plane.

In some embodiments, a graphical representation of a second version of a course is displayed including a plurality of fourth course data elements displayed within a second portion of the cylindrical surface such that the plurality of fourth course data elements are aligned on the cylindrical surface relative to relationally related portions of the plurality of first course data elements, the plurality of second course data elements, and the plurality of third course data elements.

In another embodiment of method 800, the first version of the course and the second version of the course represent different configurations of a course that existed at different points in times.

In another embodiment of method 800, the columnar course version explorer visually represents at least one difference between the first version of the course and the second version of the course. For example, as shown in FIG. 5A, data area 512 may visually illustrate how one version of a course had one number of learning objectives by showing the learning objectives as columns. A different version of that course that had a different number of learning objectives for the same course data element may then be illustrated with the corresponding different number of columns.

In another embodiment of method 800, additional user input is received in the form of a command to visualize one or more additional variations of the course. As has been previously described, the one or more additional variations comprises a reorganizing relational link between at least a portion of the plurality of first data elements and at least a portion of the plurality of second data elements. For example, the variation may be a time-domain variation, a delivery-domain variation, or some other similar type of course variation. In some embodiments, based on receiving the additional user input, the substantially two-dimensional tuning layer visualization is visually transitioned to a substantially three-dimensional columnar tuning layer visualization (for example, transitioning from tuning environment 100 of FIG. 1, to tuning environment 600 of FIG. 6.)

In some embodiments, the columnar tuning layer visualization also includes a columnar course version explorer including a cylindrical surface and a top plane traverse to the cylindrical surface. Additionally, a graphical representation of a first version of a course (including the plurality of first course data elements and plurality of second course elements) are displayed within the top plane, and a plurality of third course data elements displayed within a first portion of the cylindrical surface. In some embodiments, the plurality of third course data elements are aligned on the cylindrical surface relative to relationally related portions of the plurality of first course data elements and the plurality of second course data elements within the top plane.

Some embodiments also include a graphical representation of a second version of the course including a plurality of fourth course data elements displayed within a second portion of the cylindrical surface and aligned on the cylindrical surface relative to relationally related portions of the plurality of first course data elements, the plurality of second course data elements, and the plurality of third course data elements.

In some embodiments of method 800, based on receiving user input at the tuning layer navigator and visually highlighting the at least one course data element for the course within the first relational level and the at least one course data element for the course within the second relational level, an additional user input is received that causes an overlay window to be displayed on the display in association with at least one visually highlighted element.

In some embodiments, the overlay window includes metadata associated with the at least one visually highlighted element, additional course data elements associated with the at least one visually highlighted element, an editing interface for altering a relational identifier associated with the at least one visually highlighted element, and/or a commenting interface for associating user input with the at least one visually highlighted element.

Moving now to FIG. 9, a method 900 is illustrated. The method includes Displaying a columnar course version explorer comprising a cylindrical surface and a top plane traverse to the cylindrical surface (step 902.) Next, a graphical representation of a plurality of first course data elements that are associated with a first version of a course are displayed within the top plane (step 904.) A graphical representation of a plurality of second course data elements associated with the second version of the course are also displayed within a first portion of the cylindrical surface (step 906.)

Next, a graphical representation of a plurality of third course data elements associated with a second version of the course are displayed within a second portion of the cylindrical surface (step 908.)

Finally, the third course data elements are aligned on the cylindrical surface relative to relationally related portions of the plurality of first course data elements and the plurality of second course data elements (step 910.)

In some embodiments of method 900, a graphical representation of at least one additional version of the course is also included. This additional version includes a plurality of fourth course data elements displayed within a third portion of the cylindrical surface that are aligned on the cylindrical surface relative to relationally related portions of the plurality of first course data elements, the plurality of second course data elements, and the plurality of third course data elements.

In another embodiment of method 900, the columnar course version explorer is configured to respond to user interactions received at the display. In some embodiments, the response includes detecting a user input directed to the second version of the course and, as a result, executing a peek visualization on the second version of the course such that a plurality of fifth course data elements are displayed within a plane transverse to the second portion of the cylindrical surface.

In some embodiments of method 900, at least a portion of a plurality of fifth course data elements does not correspond to any portion of the plurality of first course data elements.

In some embodiments of method 900, a course element identifier comprising a plurality of element identifiers is displayed. Additionally, based on receiving input selecting at least one of the plurality of element identifiers, one or more data elements displayed within the columnar course version explorer that are relationally related to the selected element identifiers are visually emphasized.

In another embodiment of method 900, the columnar course version explorer is configured to rotate around a vertical axis such that, based on user input received at the visual output, the columnar course version explorer displays different corresponding portions of at least the first version of the course, the second version of the course, and at least one additional version of the course.

Moving now to FIG. 10, a method 1000 is shown. Method 1000 includes displaying a course variation explorer with a plurality of visual elements oriented along a vertical axis. Notably, each visual element includes a cylindrical surface and a top plane transverse to the cylindrical surface and represents a different variation of a collection of course data elements (step 1010.) For example, as illustrated in FIG. 6A, each of the illustrated course versions may represent one of the visual elements of method 1000 oriented along the vertical axis.

Next, a first visual element that includes a first visualization of the collection of course data elements are displayed according to a first variation (step 1020.)

Finally, a second visual element is displayed. Notably, the second visual element includes a second visualization of the collection of course data elements according to a second variation and includes the same course data elements from the first variation but is presented according to a relational variation (step 1030.) For example, as has been previously described, variations differ from versions in that any variation for the same course includes the same course data elements as other variations.

In some embodiments of method 1000, the first variation and the second variation visualize the one or more same course data elements according to different time domains, while in some embodiments of method 1000, the first variation and the second variation visualize the one or more same course data elements according to different delivery domains.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. Therefore, the scope of the invention is indicated by the appended claims rather than by the foregoing description. All changes that come within the meaning and range of equivalency of the claims are to be embraced within their scope.

What is claimed:

1. A method for tuning an educational system data structure for a course in an interactive computing environment, the method comprising:
   presenting a tuning layer at a display of the interactive computing environment, the tuning layer comprising a relational visualization of the course, including at least:
   a first plurality of course data elements for the course displayed a first relational level; and
   a second plurality of course data elements for the course displayed at a second relational level that visually surrounds the first relational level;
   receiving input from a user at a tuning layer navigator, the input selecting a relational identifier; and
   based on receiving the user input at the tuning layer navigator, visually highlighting at least one course data element for the course within the first relational level and at least one course data element for the course within the second relational level, wherein the highlighted at least one course data element within the first relational level and the highlighted at least one course data element within the second relational level are related to each other according to the relational identifier selected at the tuning layer navigator.

2. The method of claim 1, further comprising:
   receiving a different input from the user at the tuning layer navigator, the different input selecting a different relational identifier; and
   based on receiving the different input, visually highlighting at least a different course data element for the course within the first relational level and the at least one course data element for the course within the second relational level, wherein the highlighting occurs according to the different relational identifier selected at the tuning layer navigator.

3. The method of claim 1, further comprising:
   presenting, at the first tuning layer, a course data element grouping visualization, the course data element grouping visualization being displayed at a third relational level that visually surrounds the second relational level, wherein the course data element grouping visualization is presented based on receiving user input at the tuning layer navigator.

4. The method of claim 3, wherein the course data element grouping visualization is configured to provide a visual representation of a characteristic relationally tied to at least one course data element for the course within the first relational level and at least one course data element for the course within the second relational level.

5. The method of claim 1, wherein the relational visualization is a first relational visualization and the method further includes displaying the first relational visualization at the display as a substantially circular visualization such that the first plurality of course data elements for the course are arranged as a first concentric circle and the second plurality of course data elements for the course are arranged as a second concentric circle visually surrounding the concentric circle of the first plurality of course data elements.

6. The method of claim 5, further comprising:
   receiving additional user input in the form of a command to visualize one or more additional versions of the course;
   based on receiving the additional user input, transitioning from the substantially two-dimensional tuning layer visualization to a substantially three-dimensional columnar tuning layer visualization, wherein the columnar tuning layer visualization comprises at least:
   a columnar course version explorer including a cylindrical surface and a top plane traverse to the cylindrical surface;
   a graphical representation of a first version of a course including the plurality of first course data elements and plurality of second course elements displayed within the top plane, and a plurality of third course data elements displayed within a first portion of the cylindrical surface, wherein the plurality of third course data elements are aligned on the cylindrical surface relative to relationally related portions of the plurality of first course data elements and the plurality of second course data elements within the top plane; and
   a graphical representation of a second version of the course including a plurality of fourth course data elements displayed within a second portion of the cylindrical surface, wherein the plurality of fourth course data elements are aligned on the cylindrical surface relative to relationally related portions of the plurality of first course data elements, the plurality of second course data elements, and the plurality of third course data elements.

7. The method of claim 6, wherein the first version of the course and the second version of the course represent different configurations of a course that existed at different times.

8. The method of claim 6, wherein the columnar course version explorer visually represents at least one difference between the first version of the course and the second version of the course.

9. The method of claim 5, further comprising:
receiving additional user input in the form of a command to visualize one or more additional variations of the course, wherein the one or more additional variations comprises a reorganizing relational link between at least a portion of the plurality of first data elements and at least a portion of the plurality of second data elements; and
based on receiving the additional user input, transitioning from the substantially two-dimensional tuning layer visualization to a substantially three-dimensional columnar tuning layer visualization, wherein the columnar tuning layer visualization comprises at least:
a columnar course version explorer including a cylindrical surface and a top plane traverse to the cylindrical surface;
a graphical representation of a first version of a course including the plurality of first course data elements and plurality of second course elements displayed within the top plane, and a plurality of third course data elements displayed within a first portion of the cylindrical surface, wherein the plurality of third course data elements are aligned on the cylindrical surface relative to relationally related portions of the plurality of first course data elements and the plurality of second course data elements within the top plane; and
a graphical representation of a second version of the course including a plurality of fourth course data elements displayed within a second portion of the cylindrical surface, wherein the plurality of fourth course data elements are aligned on the cylindrical surface relative to relationally related portions of the plurality of first course data elements, the plurality of second course data elements, and the plurality of third course data elements.

10. The method of claim 1, wherein based on receiving the user input at the tuning layer navigator and visually highlighting the at least one course data element for the course within the first relational level and the at least one course data element for the course within the second relational level, receiving additional user input that causes an overlay window to be displayed on the display in association with at least one visually highlighted element.

11. The method of claim 10, wherein the overlay window includes one or more of the following:
metadata associated with the at least one visually highlighted element;
additional course data elements associated with the at least one visually highlighted element;
an editing interface for altering a relational identifier associated with the at least one visually highlighted element; and
a commenting interface for associating user input with the at least one visually highlighted element.

12. A computer system configured to display a multidimensional visualization for graphically representing relationships among a plurality of course data elements, the computer system comprising:
one or more processors;
one or more computer readable hardware storage media including one or more computer executable instructions that, when executed by the one or more processors, causes the computer system to produce visual output on one or more displays, the visual output comprising at least:
a columnar course version explorer comprising a cylindrical surface and a top plane traverse to the cylindrical surface;
a graphical representation of a first version of a course including a plurality of first course data elements displayed on within the top plane, and a plurality of second course data elements displayed within a first portion of the cylindrical surface, wherein the plurality of second course data elements are aligned on the cylindrical surface relative to relationally related portions of the plurality of first course data elements within the top plane; and
a graphical representation of a second version of the course including a plurality of third course data elements displayed within a second portion of the cylindrical surface, wherein the plurality of third course data elements are aligned on the cylindrical surface relative to relationally related portions of the plurality of first course data elements and the plurality of second course data elements.

13. The computer system according to claim 12, including at least a graphical representation of at least one additional version of the course, including at least a plurality of fourth course data elements displayed within a third portion of the cylindrical surface, wherein the plurality of fourth course data elements are aligned on the cylindrical surface relative to relationally related portions of the plurality of first course data elements, the plurality of second course data elements, and the plurality of third course data elements.

14. The computer system according to claim 13, wherein the columnar course version explorer is configured to respond to user interactions received at the display, including at least:
detecting a user input directed to the second version of the course; and
as a result of detecting the user input, executing a peek visualization on the second version of the course, wherein as a result of performing the peek visualization on the second version of the course, a plurality of fifth course data elements are displayed within a plane transverse to the second portion of the cylindrical surface.

15. The computer system according to claim 14, wherein at least a portion of the plurality of fifth course data elements does not correspond to any portion of the plurality of first course data elements.

16. The computer system according to claim 13, the visual output comprising:
a course element identifier comprising a plurality of element identifiers, wherein based on receiving input selecting at least one of the plurality of element identifiers, the computer system is configured to visually emphasize one or more data elements displayed within the columnar course version explorer that are relationally related to the selected element identifiers.

17. The computer system according to claim 13, wherein the columnar course version explorer is configured to rotate around a vertical axis such that, based on user input received at the visual output, the columnar course version explorer displays different corresponding portions of at least the first version of the course, the second version of the course, and the at least one additional version of the course.

18. A computer system configured to display a multidimensional visualization for graphically representing relationships among a plurality of course data elements, the computer system comprising:
- one or more processors;
- one or more computer readable hardware storage media including one or more computer executable instructions that, when executed by the one or more processors, causes the computer system to produce visual output for one or more displays, the visual output comprising at least:
  - a stacked course variation explorer comprising a plurality of visual elements oriented along a vertical axis, each visual element including a cylindrical surface and a top plane traverse to the cylindrical surface, and each visual element representing a different variation of a collection of course data elements;
  - a first visual element comprising a first visualization of the collection of course data elements according to a first variation; and
  - a second visual element comprising a second visualization of the collection of course data elements according to a second variation, wherein the first variation and the second variation include the same course data elements but are presented according to different relational variations.

19. The computer system of claim 18, wherein the first variation and the second variation visualize the one or more same course data elements according to different time domains.

20. The computer system of claim 18, wherein the first variation and the second variation visualize the one or more same course data elements according to different delivery domains.

* * * * *